(12) United States Patent
Klingler et al.

(10) Patent No.: US 9,181,467 B2
(45) Date of Patent: Nov. 10, 2015

(54) PREPARATION AND USE OF NANO-CATALYSTS FOR IN-SITU REACTION WITH KEROGEN

(75) Inventors: Robert J. Klingler, Glenview, IL (US); Randall E. Winans, Downers Grove, IL (US); Darren R. Locke, Naperville, IL (US); Marcus O. Wigand, San Ramon, CA (US); Mark Dean Looney, San Ramon, CA (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 504 days.

(21) Appl. No.: 13/335,290

(22) Filed: Dec. 22, 2011

(65) Prior Publication Data

US 2013/0161008 A1    Jun. 27, 2013

(51) Int. Cl.
| | |
|---|---|
| *E21B 43/22* | (2006.01) |
| *C09K 8/592* | (2006.01) |
| *E21B 43/16* | (2006.01) |
| *E21B 43/26* | (2006.01) |
| *C10G 1/04* | (2006.01) |
| *C10G 1/08* | (2006.01) |

(52) U.S. Cl.
CPC . *C09K 8/592* (2013.01); *C10G 1/04* (2013.01); *C10G 1/083* (2013.01); *E21B 43/16* (2013.01); *E21B 43/26* (2013.01)

(58) Field of Classification Search
CPC ...................................................... E21B 43/16
See application file for complete search history.

(56) References Cited

U.S. PATENT DOCUMENTS

| | | | |
|---|---|---|---|
| 1,269,747 A | | 6/1918 | Bogers |
| 2,423,674 A | * | 7/1947 | Agren .................. 166/272.2 |
| 2,857,002 A | * | 10/1958 | Pevere et al. ............ 166/303 |
| 2,969,226 A | | 1/1961 | Huntington |
| 3,001,775 A | | 9/1961 | Allred |

(Continued)

FOREIGN PATENT DOCUMENTS

| | | |
|---|---|---|
| WO | WO2005010320 A1 | 2/2005 |
| WO | WO 2010-093785 | 8/2010 |
| WO | WO2011007172 A2 | 1/2011 |

OTHER PUBLICATIONS

Li et al., "Reduction of Ni2+ by hydrazine in solution for the preparation of nickel nano-particles," Journal of Material Science, vol. 41, 2006, pp. 3473-3480.*

(Continued)

*Primary Examiner* — Angela M DiTrani
*Assistant Examiner* — Andrew H Sue-Ako
(74) *Attorney, Agent, or Firm* — Olson & Cepuritis, Ltd.

(57) ABSTRACT

Disclosed herein are methods for extracting a kerogen-based product from subsurface shale formations. The methods utilize in-situ reaction of kerogen involving liquid phase chemistry at ambient temperatures at pressures for the subsurface shale formation. These methods rely on chemically modifying the shale-bound kerogen to render it mobile using metal particulate catalysts. In the methods disclosed herein a fluid comprising metal is provided to the subsurface shale formation comprising kerogen in an inorganic matrix. A reducing agent is provided to the subsurface shale formation. The kerogen is converted by contacting the kerogen with a metal particulate catalyst formed from the metal; and a mobile kerogen-based product is formed. At least a portion of the mobile kerogen-based product is recovered. The kerogen-derived product can be upgraded to provide commercial products.

50 Claims, 1 Drawing Sheet

(56) References Cited

U.S. PATENT DOCUMENTS

| | | |
|---|---|---|
| 3,001,776 A | 9/1961 | Poollen et al. |
| 3,017,168 A | 1/1962 | Carr |
| 3,051,235 A * | 8/1962 | Banks .................. 166/261 |
| 3,061,009 A | 10/1962 | Shirley |
| 3,072,187 A * | 1/1963 | Carr .................... 166/258 |
| 3,076,762 A | 2/1963 | Dill |
| 3,127,935 A * | 4/1964 | Poettmann et al. ......... 166/260 |
| 3,136,361 A | 6/1964 | Marx |
| 3,139,928 A | 7/1964 | Broussard |
| 3,205,942 A | 9/1965 | Sandberg |
| 3,217,935 A | 11/1965 | Poettmann et al. |
| 3,223,158 A | 12/1965 | Baker |
| 3,228,468 A | 1/1966 | Nichols |
| 3,241,611 A | 3/1966 | Dougan |
| 3,280,910 A | 10/1966 | Crider |
| 3,285,335 A | 11/1966 | Reistle, Jr. |
| 3,292,699 A | 12/1966 | Slusser et al. |
| 3,322,194 A | 5/1967 | Strubhar |
| 3,342,258 A | 9/1967 | Prats |
| 3,342,261 A | 9/1967 | Bond |
| 3,346,044 A | 10/1967 | Slusser |
| 3,349,848 A | 10/1967 | Burgh |
| 3,358,756 A * | 12/1967 | Vogel ..................... 166/266 |
| 3,362,471 A | 1/1968 | Slusser et al. |
| 3,382,922 A | 5/1968 | Needham |
| 3,398,793 A | 8/1968 | Milton, Jr. |
| 3,400,762 A | 9/1968 | Peacock et al. |
| 3,434,757 A | 3/1969 | Prats |
| 3,437,378 A | 4/1969 | Smith |
| 3,442,789 A | 5/1969 | Zimmerman, Jr. |
| 3,455,383 A | 7/1969 | Prats et al. |
| 3,468,376 A | 9/1969 | Bramhall et al. |
| 3,474,863 A | 10/1969 | Deans et al. |
| 3,478,825 A | 11/1969 | Closmann |
| 3,480,082 A | 11/1969 | Gilliland |
| 3,481,348 A | 12/1969 | Prats |
| 3,489,672 A | 1/1970 | Shuman |
| 3,499,490 A | 3/1970 | Needham et al. |
| 3,500,913 A | 3/1970 | Closmann et al. |
| 3,502,372 A | 3/1970 | Prats |
| 3,503,868 A | 3/1970 | Shields |
| 3,504,747 A | 4/1970 | Fitch et al. |
| 3,513,913 A | 5/1970 | Bruist |
| 3,515,213 A | 6/1970 | Prats |
| 3,521,709 A | 7/1970 | Needham |
| 3,537,528 A | 11/1970 | O'Brien et al. |
| 3,548,938 A | 12/1970 | Parker |
| 3,554,283 A | 1/1971 | Abrams |
| 3,561,532 A | 2/1971 | Roberts et al. |
| 3,565,171 A | 2/1971 | Closmann |
| 3,578,080 A | 5/1971 | Closmann |
| 3,593,789 A | 7/1971 | Prats |
| 3,593,790 A | 7/1971 | Herce |
| 3,601,193 A | 8/1971 | Grady |
| 3,661,423 A | 5/1972 | Garret |
| 3,666,014 A | 5/1972 | Beard |
| 3,700,280 A | 10/1972 | Papadopoulos et al. |
| 3,766,982 A | 10/1973 | Justheim |
| 3,779,601 A | 12/1973 | Beard |
| 3,804,169 A | 4/1974 | Closmann |
| 3,804,172 A | 4/1974 | Closmann et al. |
| 3,882,941 A | 5/1975 | Pelofsky |
| 3,950,029 A | 4/1976 | Timmins |
| 3,994,343 A | 11/1976 | Cha et al. |
| 4,005,752 A | 2/1977 | Cha |
| 4,008,761 A | 2/1977 | Fisher et al. |
| 4,008,762 A | 2/1977 | Fisher et al. |
| 4,018,280 A | 4/1977 | Daviduk et al. |
| 4,026,360 A | 5/1977 | Drinkard |
| 4,027,731 A | 6/1977 | Smith et al. |
| 4,027,917 A | 6/1977 | Bartel et al. |
| 4,029,360 A | 6/1977 | French |
| 4,036,299 A | 7/1977 | Cha et al. |
| 4,045,313 A | 8/1977 | Yen et al. |
| 4,061,190 A | 12/1977 | Bloomfield |
| 4,065,183 A | 12/1977 | Hill et al. |
| 4,067,390 A | 1/1978 | Camacho et al. |
| 4,072,350 A | 2/1978 | Bartel et al. |
| 4,076,312 A | 2/1978 | Cha et al. |
| 4,082,145 A | 4/1978 | Elkington |
| 4,082,146 A | 4/1978 | Compton et al. |
| 4,083,604 A | 4/1978 | Bohn et al. |
| 4,084,640 A | 4/1978 | Allred |
| 4,091,869 A | 5/1978 | Hoyer |
| 4,105,072 A | 8/1978 | Cha |
| 4,108,760 A | 8/1978 | Williams et al. |
| 4,109,718 A | 8/1978 | Burton |
| 4,126,180 A | 11/1978 | Cha |
| 4,130,474 A | 12/1978 | Anthony |
| 4,140,180 A | 2/1979 | Bridges et al. |
| 4,144,935 A | 3/1979 | Bridges et al. |
| 4,147,388 A | 4/1979 | French |
| 4,147,389 A | 4/1979 | Bartel et al. |
| 4,148,358 A | 4/1979 | Compton |
| 4,148,359 A | 4/1979 | Laumbach et al. |
| 4,151,068 A | 4/1979 | McCollum et al. |
| 4,156,461 A | 5/1979 | Cha |
| 4,158,467 A | 6/1979 | Larson et al. |
| 4,162,808 A | 7/1979 | Kvapil et al. |
| 4,166,721 A | 9/1979 | Cha |
| 4,167,291 A | 9/1979 | Ridley |
| 4,169,506 A | 10/1979 | Berry |
| 4,176,882 A | 12/1979 | Studebaker et al. |
| 4,181,177 A | 1/1980 | Compton |
| 4,184,547 A | 1/1980 | Klass et al. |
| 4,189,376 A | 2/1980 | Mitchell |
| 4,191,251 A | 3/1980 | Cha |
| 4,192,381 A | 3/1980 | Cha |
| 4,192,552 A | 3/1980 | Cha |
| 4,193,451 A | 3/1980 | Dauphine |
| 4,193,454 A * | 3/1980 | Goldstein ................. 166/302 |
| 4,202,412 A | 5/1980 | Ruskin |
| 4,218,309 A | 8/1980 | Compton |
| 4,227,574 A | 10/1980 | Cha |
| 4,239,283 A | 12/1980 | Ridley |
| 4,239,284 A | 12/1980 | Ridley et al. |
| 4,243,100 A | 1/1981 | Cha |
| 4,246,965 A | 1/1981 | Cha |
| 4,265,307 A | 5/1981 | Elkins |
| RE30,738 E | 9/1981 | Bridges et al. |
| 4,324,292 A | 4/1982 | Jacobs et al. |
| 4,328,863 A | 5/1982 | Berry |
| 4,359,246 A | 11/1982 | Ricketts |
| 4,366,986 A | 1/1983 | Bohn et al. |
| 4,374,545 A | 2/1983 | Bullen et al. |
| 4,376,034 A | 3/1983 | Wall |
| 4,378,949 A | 4/1983 | Miller |
| 4,379,591 A | 4/1983 | Tassoney |
| 4,379,593 A | 4/1983 | Weichman |
| 4,384,614 A | 5/1983 | Justheim |
| 4,389,300 A | 6/1983 | Mitchell |
| 4,396,491 A | 8/1983 | Stiller et al. |
| 4,401,162 A | 8/1983 | Osborne |
| 4,401,163 A | 8/1983 | Elkins |
| 4,401,551 A | 8/1983 | Mitchell |
| 4,408,665 A | 10/1983 | Dougan |
| 4,423,907 A | 1/1984 | Ridley |
| 4,424,121 A | 1/1984 | Choi et al. |
| 4,425,220 A | 1/1984 | Kestner |
| 4,425,967 A | 1/1984 | Hoekstra |
| 4,435,016 A | 3/1984 | Wissenberg et al. |
| 4,436,344 A | 3/1984 | Forgac et al. |
| 4,437,519 A | 3/1984 | Cha et al. |
| 4,441,985 A | 4/1984 | Burchfield et al. |
| 4,444,258 A | 4/1984 | Kalmar |
| 4,449,586 A | 5/1984 | Urban et al. |
| 4,452,689 A | 6/1984 | Russum |
| 4,454,915 A | 6/1984 | York et al. |
| 4,457,365 A | 7/1984 | Kasevich et al. |
| 4,457,374 A | 7/1984 | Hoekstra et al. |
| 4,458,757 A | 7/1984 | Bock et al. |
| 4,458,944 A | 7/1984 | Fernandes |
| 4,470,459 A | 9/1984 | Copland |
| 4,481,099 A | 11/1984 | Mitchell |

(56) References Cited

U.S. PATENT DOCUMENTS

| | | |
|---|---|---|
| 4,483,398 A | 11/1984 | Peters et al. |
| 4,485,869 A | 12/1984 | Sresty et al. |
| 4,487,260 A | 12/1984 | Pittman et al. |
| 4,491,514 A | 1/1985 | Siskin et al. |
| 4,495,056 A | 1/1985 | Venardos et al. |
| 4,502,942 A | 3/1985 | Lee et al. |
| 4,531,783 A | 7/1985 | Ricketts |
| 4,532,991 A | 8/1985 | Hoekstra et al. |
| 4,533,181 A | 8/1985 | Ricketts |
| 4,552,214 A | 11/1985 | Forgac et al. |
| 4,584,088 A | 4/1986 | McCollum et al. |
| 4,595,056 A | 6/1986 | Zahradnik et al. |
| 4,637,464 A | 1/1987 | Forgac et al. |
| 4,640,352 A | 2/1987 | Vanmeurs et al. |
| 4,691,773 A | 9/1987 | Ward et al. |
| 4,695,373 A | 9/1987 | Ho |
| 4,698,149 A | 10/1987 | Mitchell |
| 4,703,798 A | 11/1987 | Friedman |
| 4,705,108 A | 11/1987 | Little et al. |
| 4,718,439 A | 1/1988 | Gorra et al. |
| 4,737,267 A | 4/1988 | Pao et al. |
| 4,798,668 A | 1/1989 | Ho |
| 4,856,587 A | 8/1989 | Nielson |
| 4,856,589 A | 8/1989 | Kuhlman et al. |
| 4,886,118 A | 12/1989 | Van Meurs et al. |
| 4,888,031 A | 12/1989 | Martens |
| 4,895,206 A | 1/1990 | Price |
| 4,926,941 A | 5/1990 | Glandt et al. |
| 5,020,596 A | 6/1991 | Hemsath |
| 5,058,675 A | 10/1991 | Travis |
| 5,060,726 A | 10/1991 | Glandt et al. |
| 5,091,076 A | 2/1992 | So |
| 5,236,039 A | 8/1993 | Edelstein et al. |
| 5,255,742 A | 10/1993 | Mikus |
| 5,297,626 A | 3/1994 | Vinegar et al. |
| 5,338,442 A | 8/1994 | Siskin et al. |
| 5,404,952 A | 4/1995 | Vinegar et al. |
| 5,411,089 A | 5/1995 | Vinegar et al. |
| 5,433,271 A | 7/1995 | Vinegar et al. |
| 5,843,311 A | 12/1998 | Richter et al. |
| 6,056,057 A | 5/2000 | Vinegar et al. |
| 6,079,499 A | 6/2000 | Mikus et al. |
| 6,102,122 A | 8/2000 | de Rouffignac |
| 6,279,653 B1 | 8/2001 | Wegener et al. |
| 6,547,957 B1 | 4/2003 | Sudhakar et al. |
| 6,702,016 B2 | 3/2004 | de Rouffignac et al. |
| 6,715,549 B2 | 4/2004 | Wellington et al. |
| 6,719,047 B2 | 4/2004 | Fowler et al. |
| 6,722,431 B2 | 4/2004 | Karanikas et al. |
| 6,729,395 B2 | 5/2004 | Shahin, Jr. et al. |
| 6,769,483 B2 | 8/2004 | de Rouffignac et al. |
| 6,769,486 B2 | 8/2004 | Lim et al. |
| 6,782,947 B2 | 8/2004 | de Rouffignac et al. |
| 6,877,555 B2 | 4/2005 | Karanikas et al. |
| 6,880,633 B2 | 4/2005 | Wellington et al. |
| 6,889,769 B2 | 5/2005 | Wellington et al. |
| 6,896,053 B2 | 5/2005 | Berchenko et al. |
| 6,902,004 B2 | 6/2005 | de Rouffignac et al. |
| 6,915,850 B2 | 7/2005 | Vinegar et al. |
| 6,918,442 B2 | 7/2005 | Wellington et al. |
| 6,923,257 B2 | 8/2005 | Wellington et al. |
| 6,932,155 B2 | 8/2005 | Vinegar et al. |
| 6,951,247 B2 | 10/2005 | de Rouffignac et al. |
| 6,951,248 B2 | 10/2005 | Conaway et al. |
| 6,953,087 B2 | 10/2005 | de Rouffignac et al. |
| 6,964,300 B2 | 11/2005 | Vinegar et al. |
| 6,991,032 B2 | 1/2006 | Berchenko |
| 6,991,033 B2 | 1/2006 | Wellington et al. |
| 6,991,036 B2 | 1/2006 | Sumnu-Dindoruk et al. |
| 6,994,160 B2 | 2/2006 | Wellington et al. |
| 6,994,169 B2 | 2/2006 | Zhang et al. |
| 6,997,518 B2 | 2/2006 | Vinegar et al. |
| 7,004,251 B2 | 2/2006 | Ward et al. |
| 7,011,154 B2 | 3/2006 | Maher et al. |
| 7,013,972 B2 | 3/2006 | Vinegar et al. |
| 7,032,660 B2 | 4/2006 | Vinegar et al. |
| 7,051,811 B2 | 5/2006 | de Rouffignac et al. |
| 7,055,600 B2 | 6/2006 | Messier et al. |
| 7,073,578 B2 | 7/2006 | Vinegar et al. |
| 7,077,198 B2 | 7/2006 | Vinegar et al. |
| 7,086,465 B2 | 8/2006 | Wellington et al. |
| 7,090,013 B2 | 8/2006 | Wellington |
| 7,091,460 B2 | 8/2006 | Kinzer |
| 7,096,942 B1 | 8/2006 | de Rouffignac et al. |
| 7,100,994 B2 | 9/2006 | Vinegar et al. |
| 7,114,566 B2 | 10/2006 | Vinegar et al. |
| 7,121,342 B2 | 10/2006 | Vinegar et al. |
| 7,344,889 B2 | 3/2008 | Kelemen et al. |
| 7,416,022 B2 | 8/2008 | Maguire |
| 7,441,603 B2 | 10/2008 | Kaminsky et al. |
| 7,484,561 B2 | 2/2009 | Bridges |
| 7,500,517 B2 | 3/2009 | Looney et al. |
| 7,510,000 B2 | 3/2009 | Pastor-Sanz et al. |
| 7,540,324 B2 | 6/2009 | de Rouffignac et al. |
| 7,543,638 B2 | 6/2009 | Goodman |
| 7,549,470 B2 | 6/2009 | Vinegar et al. |
| 7,556,096 B2 | 7/2009 | Vinegar et al. |
| 7,559,368 B2 | 7/2009 | Vinegar et al. |
| 7,562,707 B2 | 7/2009 | Miller |
| 7,584,789 B2 | 9/2009 | Mo et al. |
| 7,604,052 B2 | 10/2009 | Roes et al. |
| 7,631,690 B2 | 12/2009 | Vinegar et al. |
| 7,635,023 B2 | 12/2009 | Goldberg et al. |
| 7,669,657 B2 | 3/2010 | Symington et al. |
| 7,712,528 B2 | 5/2010 | Langdon et al. |
| 7,735,935 B2 | 6/2010 | Vinegar et al. |
| 7,789,164 B2 | 9/2010 | Looney et al. |
| 7,841,407 B2 | 11/2010 | Wellington et al. |
| 7,841,408 B2 | 11/2010 | Vinegar |
| 7,845,411 B2 | 12/2010 | Vinegar et al. |
| 7,849,922 B2 | 12/2010 | Vinegar et al. |
| 7,857,056 B2 | 12/2010 | Kaminsky et al. |
| 7,862,705 B2 | 1/2011 | Dana et al. |
| 7,866,386 B2 | 1/2011 | Beer et al. |
| 7,906,014 B2 | 3/2011 | Dana et al. |
| 7,942,203 B2 | 5/2011 | Vinegar et al. |
| 7,950,453 B2 | 5/2011 | Farmayan et al. |
| 7,967,974 B2 | 6/2011 | Dana et al. |
| 7,980,312 B1 | 7/2011 | Hill et al. |
| 8,701,788 B2 * | 4/2014 | Wigand .................. 166/403 |
| 2002/0029882 A1 | 3/2002 | de Rouffignac et al. |
| 2002/0033253 A1 | 3/2002 | de Rouffignac et al. |
| 2002/0033256 A1 | 3/2002 | Wellington et al. |
| 2002/0033257 A1 | 3/2002 | Shahin, Jr. et al. |
| 2002/0036084 A1 | 3/2002 | Vinegar et al. |
| 2002/0036089 A1 | 3/2002 | Vinegar et al. |
| 2002/0038705 A1 | 4/2002 | Wellington et al. |
| 2002/0038709 A1 | 4/2002 | Wellington et al. |
| 2002/0038710 A1 | 4/2002 | Maher et al. |
| 2002/0038711 A1 | 4/2002 | de Rouffignac et al. |
| 2002/0040173 A1 | 4/2002 | de Rouffignac et al. |
| 2002/0040778 A1 | 4/2002 | Wellington et al. |
| 2002/0040779 A1 | 4/2002 | Wellington et al. |
| 2002/0040780 A1 | 4/2002 | Wellington et al. |
| 2002/0040781 A1 | 4/2002 | Keedy et al. |
| 2002/0045553 A1 | 4/2002 | Vinegar et al. |
| 2002/0046832 A1 | 4/2002 | Zhang et al. |
| 2002/0046837 A1 | 4/2002 | Wellington et al. |
| 2002/0046838 A1 | 4/2002 | Karanikas et al. |
| 2002/0049360 A1 | 4/2002 | Wellington et al. |
| 2002/0050352 A1 | 5/2002 | Wellington et al. |
| 2002/0050357 A1 | 5/2002 | Wellington et al. |
| 2002/0052297 A1 | 5/2002 | de Rouffignac et al. |
| 2002/0053429 A1 | 5/2002 | Stegemeier et al. |
| 2002/0053431 A1 | 5/2002 | Wellington et al. |
| 2002/0053435 A1 | 5/2002 | Vinegar et al. |
| 2002/0056551 A1 | 5/2002 | Wellington et al. |
| 2002/0056552 A1 | 5/2002 | Wellington et al. |
| 2002/0057905 A1 | 5/2002 | Wellington et al. |
| 2002/0062052 A1 | 5/2002 | de Rouffignac et al. |
| 2002/0062961 A1 | 5/2002 | Vinegar et al. |
| 2002/0066565 A1 | 6/2002 | de Rouffignac et al. |
| 2002/0076212 A1 | 6/2002 | Zhang et al. |
| 2002/0084074 A1 | 7/2002 | de Rouffignac et al. |

(56) References Cited

U.S. PATENT DOCUMENTS

| | | |
|---|---|---|
| 2002/0096320 A1 | 7/2002 | Wellington et al. |
| 2003/0040441 A1 | 2/2003 | Miller et al. |
| 2003/0062164 A1 | 4/2003 | Wellington et al. |
| 2003/0079877 A1 | 5/2003 | Wellington et al. |
| 2003/0098149 A1 | 5/2003 | Wellington et al. |
| 2003/0098605 A1 | 5/2003 | Vinegar et al. |
| 2003/0102125 A1 | 6/2003 | Wellington et al. |
| 2003/0102130 A1 | 6/2003 | Vinegar et al. |
| 2003/0116315 A1 | 6/2003 | Wellington et al. |
| 2003/0130136 A1 | 7/2003 | de Rouffignac et al. |
| 2003/0137181 A1 | 7/2003 | Wellington et al. |
| 2003/0141067 A1 | 7/2003 | de Rouffignac et al. |
| 2003/0142964 A1 | 7/2003 | Wellington et al. |
| 2003/0146002 A1 | 8/2003 | Vinegar et al. |
| 2003/0155111 A1 | 8/2003 | Vinegar et al. |
| 2003/0173072 A1 | 9/2003 | Vinegar et al. |
| 2003/0173080 A1 | 9/2003 | Berchenko et al. |
| 2003/0173081 A1 | 9/2003 | Vinegar et al. |
| 2003/0173082 A1 | 9/2003 | Vinegar et al. |
| 2003/0183390 A1 | 10/2003 | Veenstra et al. |
| 2003/0196789 A1 | 10/2003 | Wellington et al. |
| 2003/0196810 A1 | 10/2003 | Vinegar et al. |
| 2003/0201098 A1 | 10/2003 | Karanikas et al. |
| 2003/0205378 A1 | 11/2003 | Wellington et al. |
| 2003/0213594 A1 | 11/2003 | Wellington et al. |
| 2004/0015023 A1 | 1/2004 | Wellington et al. |
| 2004/0020642 A1 | 2/2004 | Vinegar et al. |
| 2004/0149433 A1 | 8/2004 | McQueen |
| 2005/0252656 A1 | 11/2005 | Maguire |
| 2005/0269091 A1 | 12/2005 | Pastor-Sanz et al. |
| 2007/0012598 A1 | 1/2007 | Rendall |
| 2007/0023186 A1 | 2/2007 | Kaminsky et al. |
| 2007/0137858 A1* | 6/2007 | Considine et al. ............ 166/248 |
| 2007/0193743 A1 | 8/2007 | Harris et al. |
| 2007/0209799 A1 | 9/2007 | Vinegar et al. |
| 2007/0221377 A1 | 9/2007 | Vinegar et al. |
| 2007/0284107 A1 | 12/2007 | Crichlow |
| 2008/0006410 A1 | 1/2008 | Looney et al. |
| 2008/0017549 A1 | 1/2008 | Kennel et al. |
| 2008/0023197 A1 | 1/2008 | Shurtleff |
| 2008/0059140 A1 | 3/2008 | Salmon et al. |
| 2008/0087427 A1 | 4/2008 | Kaminsky et al. |
| 2008/0087428 A1 | 4/2008 | Symington et al. |
| 2008/0115935 A1* | 5/2008 | Mango ......................... 166/259 |
| 2008/0116694 A1 | 5/2008 | Hendershot |
| 2008/0164030 A1 | 7/2008 | Young |
| 2008/0173450 A1 | 7/2008 | Goldberg et al. |
| 2008/0207970 A1 | 8/2008 | Meurer et al. |
| 2008/0217008 A1* | 9/2008 | Langdon et al. .............. 166/270 |
| 2008/0257552 A1 | 10/2008 | Shurtleff et al. |
| 2008/0283241 A1 | 11/2008 | Kaminsky et al. |
| 2008/0290719 A1 | 11/2008 | Kaminsky et al. |
| 2008/0314593 A1 | 12/2008 | Vinegar et al. |
| 2009/0014179 A1 | 1/2009 | Mango |
| 2009/0014181 A1 | 1/2009 | Vinegar et al. |
| 2009/0050319 A1 | 2/2009 | Kaminsky et al. |
| 2009/0078415 A1 | 3/2009 | Fan et al. |
| 2009/0101346 A1 | 4/2009 | Vinegar et al. |
| 2009/0133935 A1 | 5/2009 | Kinkead |
| 2009/0200022 A1 | 8/2009 | Bravo et al. |
| 2009/0200023 A1 | 8/2009 | Costello et al. |
| 2009/0242196 A1 | 10/2009 | Pao |
| 2009/0250381 A1 | 10/2009 | Fan et al. |
| 2009/0313772 A1 | 12/2009 | Talley |
| 2010/0012331 A1* | 1/2010 | Larter et al. .................. 166/401 |
| 2010/0032171 A1 | 2/2010 | Bali et al. |
| 2010/0056404 A1 | 3/2010 | Talley |
| 2010/0126727 A1 | 5/2010 | Vinegar et al. |
| 2010/0173806 A1 | 7/2010 | Fan et al. |
| 2010/0200232 A1 | 8/2010 | Langdon et al. |
| 2010/0200234 A1 | 8/2010 | Mango |
| 2010/0218945 A1 | 9/2010 | Sadok |
| 2010/0270015 A1 | 10/2010 | Vinegar et al. |
| 2010/0270038 A1 | 10/2010 | Looney et al. |
| 2010/0282460 A1 | 11/2010 | Stone et al. |
| 2010/0319909 A1 | 12/2010 | Symington et al. |
| 2011/0000825 A1 | 1/2011 | McGrady et al. |
| 2011/0049016 A1 | 3/2011 | McGrady et al. |
| 2011/0088904 A1 | 4/2011 | De Rouffignac et al. |
| 2011/0146982 A1 | 6/2011 | Kaminsky et al. |
| 2011/0174496 A1 | 7/2011 | Burnham et al. |
| 2011/0180262 A1 | 7/2011 | O'Dowd |
| 2011/0186296 A1 | 8/2011 | Cassidy |
| 2011/0290490 A1 | 12/2011 | Kaminsky et al. |
| 2011/0303413 A1 | 12/2011 | Fairbanks et al. |
| 2012/0261128 A1* | 10/2012 | Cassidy ......................... 166/303 |
| 2012/0273190 A1* | 11/2012 | Thomas et al. ............... 166/248 |

OTHER PUBLICATIONS

U.S. Pat. No. 6,595,286 B2, Jul. 22, 2003, Fowler et al., (withdrawn).
Vandenbrouck, M. et al., "Kerogen origin, evolution and structure", *Organic Geochemistry* 38:719-833 (2007).
Philp, R.P. et al., "Saponification of the Insoluble Organic Residues from Oil Shales, Algal Oozes, and Algae", *Energy Sources* 4(2): 113-123 (1978).
Huseby, B. and Ocampo, R, "Evidence for porphyrins bound, via ester bonds, to the Messel oil shale kerogen by selective chemical degradation experiments", *Geochimica et Cosmochimica Acta* 61(18):3951-3955 (1997).
Amblès, A., et al., "Ester- and ether bond cleavage in immature kerogens", *Org. Geochem* 24(6/7):681-690 (1996).
McGowan, C.W., et al., "A Comparison of the Dissolution of Model Compounds and the Kerogen of Green River Oil Shale by Oxidation with Perchloric Acid—A Model for the Kerogen of the Green River Oil Shale", *Fuel Processing Technology* 10:195-204 (1985).
McGowan, Chris W., "The Oxidation of Green River Oil Shale with Perchloric Acid—Part I—The Reaction of Green River Oil Shale with Perchloric of Varying Concentration and Boiling Point", *Fuel Processing Technology* 10:169-179 (1985).
McGowan, Chris W., et al., "The Role of Ether Oxygen and Carbon Double Bonds as Linkages During the Dissolution of Kerogens with Perchloric Acid" *ACS Fuel* 42(1):172-175 (Spring 1997).
Boucher, Raymond J., et al., "Molecular characterization of kerogens by mild selective chemical degradation—ruthenium tetroxide oxidation", *Fuel* 70:695-708 (1991).
Robinson, W.E., et al., "Constitution of Organic Acids Prepared from Colorado Oil Shale", *Industrial and Engineering Chemistry* 48(7):1134-1128 (1956).
Philp, R.P. and Yang, E., "Alkaline Potassium Permanganate Degradation of Insoluble Organic Residues (Kerogen) Isolated from Recently—Deposited Algal Mats" *Energy Sources* 3(2):149-161 (1997).
Robinson, W.E., et al., "Alkaline Permanganate Oxidation of Oil-Shale Kerogen", *Industrial and Engineering Chemistry* 45(4):788-791 (1953).
Djuricic, M., et al., "Organic acids obtained by alkaline permanganate oxidation of kerogen from the Green River (Colorado) shale", *Geochimica et Cosmochimica Acta* 35:1201-1207 (1971).
Young, D.K. and Yen, T.F., "The nature of straight-chain aliphatic sstructures in Green River kerogen", *Geochimica et Cosmochimica Acta* 41:1411-1417 (1977).
Amblès, A., et al., "Nature of Kerogen from Green River Shale based on the Charactyer of the Products of a Forty-Step Alkaline Permanganate Oxidation", *Adv. Org. Geochem* 554-560 (1981).
Vitorović, D., et al., "Improvement of kerogen structural interpretations based on oxidation products isolated from aqueous solutions", *Advances in Organic Geochemistry* 10:1119-1126 (1985).
Vitorović, D., et al., "Relationship between kerogens of various structural types and the products of their multistep oxidative degradation", *Org. Geochem.* 6:333-342 (1984).
Vitorović, D., et al., "The feasibilities of the alkaline permanganate degradation method for the characterization and classification of kerogens", *J. Serb. Chem. Soc.* 53(4):175-189 (1988).
Burlingame, A.L. and Simoneit, B.R., "High Resolution Mass Spectrometry of Green River Formation Kerogen Oxidations", *Nature* 222:741-747 (1969).

(56) References Cited

OTHER PUBLICATIONS

Simoneit, B.R., et al., "Sterochemical studies of acyclis isoprenoid compounds—V. Oxidation products of Green River Formation oil shale kerogen", *Geochimica et Cosmochimica Acta* 39:1143-1145 (1975).

Burlingame, A.L. and Simoneit, B.R., "Isoprenoid Fatty Acids Isolated from the Kerogen Matrix of the Green River Formation (Eocene)", *Science* 160:531-533 (1968).

Simoneit, B.R. and Burlingame, A.L., "Carboxylic acids derived from Tasmanian tasmanite by extractions and kerogen oxidations", *Geochimica et Cosmochimica Acta* 37:595-610 (1973).

Hayatsu, Ryoichi, et al., "Investigation of aqueous sodium dichromate oxidation for coal structural studies", *Fuel* 60:77-82 (1981).

Hayatsu, Ryoichi, et al., "Is kerogen-like material present in coal: 2. Chromic acid oxidation of coal and kerogen", *Fuel* 60:161-203 (1981).

Barakat, A.O. and Yen, T.F., "Distribution of Acyclic Isoprenoids in Fractions from Stepwise Oxidation of Greene River Kerogen", *Energy Sources* 10:253-259 ((1988).

Barakat, A.O., "Carboxylic Acids Obtained by Alkaline Hydrolysis of Monterey Kerogen", *Energy and Fuels* 7:988-993 (1993).

Barakat, Assem O., Size Distribution of the Straight-Chain Structures in Type I and II Kerogens, *Energy and Fuels* 2:181-185 (1988).

Barakat, A.O. and Yen, T.F., "Distribution of pentacyclic triterpenoids in Green River oil shale kerogen", *Org. Geochem.* 15(3):299-311 (1990).

Barakat, A.O. and Yen, T.F., "The Nature of Porphyrins in Kerogen. Evidence of Entrapped Etioporphyrin Species", *Energy & Fuels* 3:613-616 (1989).

Barakat, A.O. and Yen, T.F., "Novel Identification of 17β(H)-Hopanoids in Green River Oil Shale Kerogen", *Energy & Fuels* 2:105-108 (1988).

Barakat, Assem O. and Yen, Teh Fu, "Kerogen structure by stepwise oxidation; Use of sodium dichromate in glacial acetic acid", *Fuel* 66:587-753 (1987).

U.S. Appl. No. 13/481,303, filed May 25, 2012, entitled "Isolating Lubricating Oils from Subsurface Shale Formations".

U.S. Appl. No. 13/491,925, filed Jun. 8, 2012, entitled "Soluble Acids from Naturally Occurring Aqueous Streams".

Rodriguez-Vazques, M.J., et al., "Synthesis and characterization of gold atomic clusters by the two-phase method" Eur. Phys. J.D. 52; 23-26 (2009).

Ledo-Suarez, Ana, et al., "Facile Synthesis of Stable Subnanosized Silver Clusters in Microemulsions", Angew. Chem. Int. Ed. 2007, 46, 8823-8827.

Guillen-Villafuerte, Olmedo, "Assembly of Subnanometric 2D Pt Nanoislands in Parallel Rows onto Au(111) by Self-Organization of Pt Clusters", Angew. Chem. Int. Ed. 2006, 45, 4266-4269.

Andre Ambles et al., Structural characterization of the kerogen from Youssoufia phosphate formation using mild potassium permanganate oxidation. Organic Geochemistry, vol. 39, Issue 6, Jun. 2008, pp. 730-740.

PCT International Search Report regarding PCT/US2011/067023 dated Aug. 30, 2012 (5 pgs).

U.S. Appl. No. 13/335,409, filed Dec. 22, 2011, entitled "In-Situ Kerogen Conversion and Recovery".

U.S. Appl. No. 13/335,525, filed Dec. 22, 2011, entitled "In-Situ Kerogen Conversion and Product Isolation".

U.S. Appl. No. 13/335,607, filed Dec. 22, 2011, entitled "In-Situ Kerogen Conversion and Product Upgrading".

U.S. Appl. No. 13/335,673, filed Dec. 22, 2011, entitled "In-Situ Kerogen Conversion and Recycling".

U.S. Appl. No. 13/335,195, filed Dec. 22, 2011, entitled "Preconditioning a Subsurface Shale by Removing Extractable Organics".

U.S. Appl. No. 13/335,864, filed Dec. 22, 2011, entitled "Kerogen Conversion in a Subsurface Shale Formation with Oxidant Regeneration".

U.S. Appl. No. 13/335,907, filed Dec. 22, 2011, entitled "Electrokinetic Enhanced Hydrocarbon Recovery from Oil Shale".

* cited by examiner

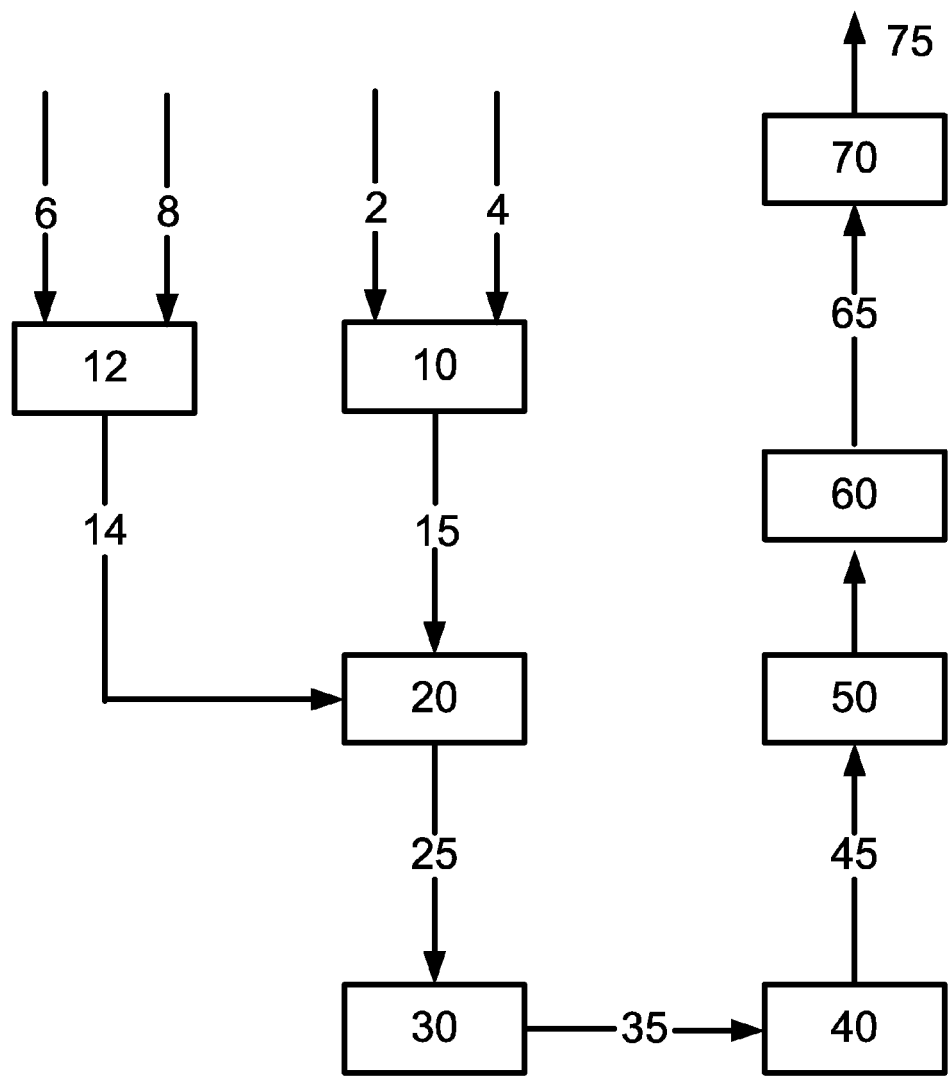

PREPARATION AND USE OF NANO-CATALYSTS FOR IN-SITU REACTION WITH KEROGEN

RELATED APPLICATIONS

The subject application is related to U.S. Provisional Application Ser. No. 61/426,340, filed Dec. 22, 2010. This application is also related to U.S. application Ser. No. 13/335,409, entitled "In-Situ Kerogen Conversion and Recovery" filed Dec. 22, 2011; U.S. application Ser. No. 13/335,525, entitled "In-Situ Kerogen Conversion and Product Isolation" filed Dec. 22, 2011; U.S. application Ser. No. 13/335,607, entitled "In-Situ Kerogen Conversion and Upgrading" filed Dec. 22, 2011; U.S. application Ser. No. 13/335,673, entitled "In-Situ Kerogen Conversion and Recycling" filed Dec. 22, 2011; and U.S. application Ser. No. 13/335,195, entitled "Preconditioning a Subsurface Shale Formation by removing Extractible Organics" filed Dec. 22, 2011. The contents of all of these related applications are incorporated herein by reference in their entirety.

BACKGROUND

If proponents of Hubbert peak theory are correct, world oil production will soon peak, if it has not done so already. Regardless, world energy consumption continues to rise at a rate that outpaces new oil discoveries. As a result, alternative sources of energy must be developed, as well as new technologies for maximizing the production and efficient consumption of oil. See T. Mast, Over a Barrel: A Simple Guide to the Oil Shortage, Greenleaf Book Group, Austin, Tex., 2005.

A particularly attractive alternative source of energy is oil shale, the attractiveness stemming primarily from the fact that oil can be "extracted" from the shale and subsequently refined in a manner much like that of crude oil. Technologies involving the extraction, however, must be further developed before oil shale becomes a commercially-viable source of energy. See J. T. Bartis et al, Oil Shale Development in the United States: Prospects and Policy Issues, RAND Corporation, Arlington, Va., 2005.

The largest known deposits of oil shale are found in the Green River Formation, which covers portions of Colorado, Utah, and Wyoming. Estimates on the amount of recoverable oil from the Green River Formation deposits are as high as 1.1 trillion barrels of oil—almost four times the proven oil reserves of Saudi Arabia. At current U.S. consumption levels (~20 million barrels per day), these shale deposits could sustain the U.S. for another 140 years (Bartis et al.) At the very least, such shale resources could moderate the price of oil and reduce U.S. dependence on foreign oil.

Oil shale typically consists of an inorganic component (primarily carbonaceous material, i.e., a carbonate), an organic component (kerogen) that can only be mobilized by breaking the chemical bonds in the kerogen, and frequently a second organic component (bitumen). Thermal treatment can be employed to break (i.e., "crack") the kerogen into smaller hydrocarbon chains or fragments, which are gas or liquids under retort conditions, and facilitate separation from the inorganic material. This thermal treatment of the kerogen is also known as "thermal upgrading" or "retorting," and can be done at either the surface or in situ, where in the latter case, the fluids so formed are subsequently transported to the surface.

In some applications of surface retorting, the oil shale is first mined or excavated, and once at the surface, the oil shale is crushed and then heated (retorted) to complete the process of transforming the oil shale to a crude oil—sometimes referred to as "shale oil." See, e.g., Shuman et al., U.S. Pat. No. 3,489,672. The crude oil is then shipped off to a refinery where it typically requires additional processing steps (beyond that of traditional crude oil) prior to making finished products such as gasoline, lubricant, etc. Note that various chemical upgrading treatments can also be performed on the shale prior to the retorting, See, e.g., So et al., U.S. Pat. No. 5,091,076.

A method for in situ retorting of carbonaceous deposits such as oil shale has been described in Kvapil et al., U.S. Pat. No. 4,162,808. In this method, shale is retorted in a series of rubblized in situ retorts using combustion (in air) of carbonaceous material as a source of heat.

The Shell Oil Company has been developing new methods that use electrical heating for the in situ upgrading of subsurface hydrocarbons, primarily in subsurface formations located approximately 200 miles (320 km) west of Denver, Colo. See, e.g., Vinegar et al., U.S. Pat. No. 7,121,342; and Berchenko et al., U.S. Pat. No. 6,991,032. In such methods, a heating element is lowered into a well and allowed to heat the kerogen over a period of approximately four years, slowly converting (upgrading) it into oils and gases, which are then pumped to the surface. To obtain even heating, 15 to 25 heating holes could be drilled per acre. Additionally, a ground-freezing technology to establish an underground barrier around the perimeter of the extraction zone is also envisioned to prevent groundwater from entering and the retorting products from leaving. While the establishment of "freeze walls" is an accepted practice in civil engineering, its application to oil shale recovery still has unknown environmental impacts. Additionally, the Shell approach is recognized as an energy intensive process and requires a long timeframe to establish production from the oil shale.

In view of the aforementioned limitations of the above methods, simpler and more cost-effective methods of extracting and upgrading kerogen from a subsurface shale formation would be extremely useful.

SUMMARY OF THE INVENTION

The present invention is directed to processes for producing mobile products from the organic matter that occurs in subsurface oil shale. Among other factors, these processes are based on the discovery that kerogen in oil shale can be made to react at temperatures below pyrolysis temperatures to produce mobile reaction products that can be removed from the subsurface shale formation, recovered in surface facilities and upgraded to produce useful products, refinery feedstocks, fuel and lubricant blendstocks, reaction intermediates and the like. The presently disclosed processes are more environmentally benign, more economical, and more efficient in producing commercial products.

Disclosed herein is a process for extracting a kerogen-based product from a subsurface shale formation comprising kerogen in an inorganic matrix. The process comprises the steps of: a) providing a fluid comprising metal to the subsurface shale formation comprising kerogen in an inorganic matrix; b) providing a reducing agent to the subsurface shale formation; c) converting the kerogen by contacting the kerogen with a metal particulate catalyst formed from the metal; d) forming a mobile kerogen-based product; and e) recovering at least a portion of the mobile kerogen-based product. In the presently disclosed methods, the metal can be in the form of ionic metal, complexed metal, or encapsulated metal.

In a further embodiment disclosed herein is a process for extracting a kerogen-based product from a subsurface shale formation comprising kerogen in an inorganic matrix. The process comprises the steps of: a) providing a fluid comprising at least one ionic metal to the subsurface shale formation comprising kerogen in an inorganic matrix; b) contacting the ionic metal with a reducing agent to form a metal particulate catalyst; c) converting the kerogen by contacting the kerogen with the metal particulate catalyst to form a mobile kerogen-based product; and d) recovering at least a portion of the mobile kerogen-based product.

Disclosed also is a process for extracting a kerogen-based product from a subsurface shale formation comprising kerogen in an inorganic matrix comprising the steps of: a) providing a fluid comprising at least one ionic metal to the subsurface shale formation comprising kerogen in an inorganic matrix; b) contacting the ionic metal with a first reducing agent to form a metal particulate catalyst; c) converting the kerogen by contacting the kerogen with the metal particulate catalyst in the presence of a second reducing agent to form a mobile kerogen-based product; and d) recovering at least a portion of the mobile kerogen-based product.

In a further embodiment disclosed herein is a process for extracting a kerogen-based product from a subsurface shale formation comprising kerogen in an inorganic matrix. The process comprises the steps of: a) extracting extractible organics from the subsurface shale formation comprising kerogen in an inorganic matrix; b) oxidizing the kerogen in the subsurface shale formation; c) providing a fluid comprising at least one ionic metal to the subsurface shale formation comprising kerogen in an inorganic matrix; d) contacting the ionic metal with a reducing agent to form a metal particulate catalyst; e) converting the kerogen by contacting the kerogen with the metal particulate catalyst to form a mobile kerogen-based product; and f) recovering at least a portion of the mobile kerogen-based product.

The metal and/or metal particulate catalysts are deposited and/or adhere to the surface of the kerogen and the metal particulate catalysts catalyze reactions creating mobile kerogen-based products.

BRIEF DESCRIPTION OF THE DRAWINGS

The FIGURE is a block diagram illustrating an exemplary process for extracting a kerogen-based product from a subsurface shale formation using a metal particulate catalyst as disclosed herein.

DETAILED DESCRIPTION OF THE INVENTION

Introduction

The present invention is directed to methods of extracting a kerogen-based product from subsurface shale formation comprising kerogen in an inorganic matrix. The methods rely on chemically modifying the shale-bound kerogen to render it mobile using metal particulate catalysts. The metal particulate catalysts surprisingly can be used for in-situ reaction of kerogen to create mobile kerogen-based products. The metal particulate catalysts are smaller than microscopic in scale. Their small size is important in their utility in the methods disclosed herein. The present invention is also directed to systems for implementing such methods.

The reducing agent can be selected from the group consisting of hydrogen, hydrazine, sodium borohydride ($NaBH_4$), hydrogen donor solvents, and mixtures thereof. The hydrogen donor solvents can be selected from the group consisting of decalin, tetralin, tetrahydroborate, and the like, and mixtures thereof.

DEFINITIONS

In accordance with this detailed description, the following abbreviations and definitions apply. It must be noted that as used herein, the singular forms "a", "an", and "the" include plural referents unless the context clearly dictates otherwise. Thus, for example, reference to a "reducing agent" includes a plurality of such.

As used herein, the terms "hydrocarbon" or "hydrocarbonaceous" or "petroleum" are used interchangeably to refer to material originating from oil shale, coal, tar sands, crude oil, natural gas or biological processes. Carbon and hydrogen are major components of hydrocarbons; minor components, such as oxygen, sulfur and nitrogen may also occur in some hydrocarbons. The hydrocarbon fraction includes both aliphatic and aromatic components. The aliphatic component can further be divided into acyclic alkanes, referred to as paraffins, and cycloalkanes, referred to as naphthenes. A paraffin refers to a non-cyclic, linear (normal paraffin) or branched (iso-paraffin) saturated hydrocarbon. For example, a $C_8$ paraffin is a non-cyclic, linear or branched hydrocarbon having 8 carbon atoms per molecule. Normal octane, methylheptane, dimethylhexane, and trimethylpentane are examples of $C_8$ paraffins. A paraffin-rich feed comprises at least 10 wt %, at least 20 wt % or even at least 30 wt % paraffins. For example, a $C_8$ rich paraffinic feedstock contains at least 10 wt. % $C_8$ hydrocarbons.

As disclosed herein, boiling point temperatures are based on the ASTM D-2887 standard test method for boiling range distribution of petroleum fractions by gas chromatography, unless otherwise indicated. The mid-boiling point is defined as the 50% by volume boiling temperature, based on an ASTM D-2887 simulated distillation.

As disclosed herein, carbon number values (i.e., $C_5$, $C_6$, $C_8$, $C_9$ and the like) generally refers to a number of carbon atoms within a molecule. Carbon number ranges as disclosed herein (e.g., $C_8$ to $C_{12}$) refer to molecules having a carbon number within the indicated range (e.g., between 8 carbon and 12 carbon atoms), including the end members of the range. Likewise, an open ended carbon number range (e.g., $C_{35}+$) refers to molecules having a carbon number within the indicated range (e.g., 35 or more carbon atoms), including the end member of the range. As described herein, carbon number distributions are determined by true boiling point distribution and gas liquid chromatography.

Unless otherwise specified, feed rate to a catalytic reaction zone is reported as the volume of feed per volume of catalyst per hour. In effect, the feed rate as disclosed herein, referred to as liquid hourly space velocity (LHSV), is reported in reciprocal hours (i.e., $hr^{-1}$).

As used herein, the value for octane refers to the research octane number (RON), as determined by ASTM D2699.

The term "surface facility" as used herein is any structure, device, means, service, resource or feature that occurs, exists, takes place or is supported on the surface of the earth. The kerogen products that are generated in the process disclosed herein are recovered in surface facilities and upgraded or transported for upgrading.

"Shale," as defined herein, generally refers to "oil shale" and is a general term applied to a group of rocks rich enough in organic material (called kerogen) to yield petroleum upon pyrolysis and distillation. Such shale is generally subsurface and comprises an inorganic (usually carbonate) component or matrix in addition to the kerogen component.

A "subsurface shale formation," as defined herein, is an underground geological formation comprising (oil) shale. The subsurface shale formation comprises kerogen in an inorganic matrix.

A "low-permeability hydrocarbon-bearing formation," as defined herein, refers to formations having a permeability of less than about 10 millidarcies, wherein the formations comprise hydrocarbonaceous material. Examples of such formations include, but are not limited to, diatomite, coal, tight shales, tight sandstones, tight carbonates, and the like.

"Kerogen," as defined herein and as mentioned above, is an organic component of shale. On a molecular level, kerogen comprises very high molecular weight molecules that are generally insoluble by virtue of their high molecular weight and likely bonding to the inorganic component or matrix of the shale. In a geologic sense, kerogen is a precursor to crude oil. Kerogen is typically identified as being one of five types: Type I, Type II, Type II-sulfur, Type III, or Type IV, based on its C:H:O ratio and sulfur content, the various types generally being derived from different sources of ancient biological matter.

"Kerogen-based" and "kerogen-derived" are terms used herein to denote a molecular product or intermediate derived from kerogen, such derivation requiring a chemical modification of the kerogen, and the term being exclusive of derivations carried out over geologic timescales.

"Extractible organics" are organic components of the subsurface shale formation that are at least partially soluble in an organic solvent. In contrast, the kerogen is not soluble in organic solvent. This organic component that is at least partially soluble is referred to herein as "extractible organics". This extractible organic component includes what is commonly referred to as "bitumen". The extractable organic component is a solid or semi-solid material that is soluble or at least partially soluble in an organic solvent. As such, the extractable organic component can be removed by extraction using an organic solvent. Extraction of the extractable organic component makes the kerogen more accessible. In the present methods, extraction of the extractable organic component makes the kerogen more accessible to the metal for reaction to create mobile kerogen-based product.

The term "aqueous fluid" as used herein refers to any water containing fluid, such as, municipal water; surface water, including from a lake, sea, ocean, river, and/or stream; formation water; water associated with industrial activity; or mixtures thereof.

The term "formation fluid" or "formation water" as used herein refers to the fluid, typically, water or aqueous fluid that is naturally occurring in a geological formation, such as the subsurface shale formation, or in a subsurface aquifer. The amount (or presence) of formation water in the formation, and the amount (or presence) of formation water in contact with the kerogen in the formation, depends on a number of factors, including the depth of the subsurface shale formation or the kerogen deposit that is within at least a portion of the subsurface shale formation. The naturally occurring formation water may contain dissolved alkali materials from naturally occurring deposits in the environment of the subsurface shale. In some cases, formation water is present in the formation prior to the start of the process for extracting a kerogen-based product from a subsurface shale formation.

A "surfactant" as used herein refers to any substance that reduces surface tension of a liquid, or reduces interfacial tension between two liquids, or between a liquid and a solid, or facilitates the dispersion of an organic material into an aqueous solution.

The term "basic solution," as used herein, refers to an aqueous solution having a pH of greater than 7.0.

The term "acidic solution," as used herein, refers to an aqueous solution having a pH of less than 7.0.

A "dense phase fluid," as defined herein, is a non-gaseous fluid. Such dense phase fluids include liquids and supercritical fluids (SCFs). The dense phase fluid can be any such fluid that suitably provides for increased accessibility of the kerogen to a fluid—typically due to fracturing and/or rubblizing of the shale in which the kerogen resides.

A "supercritical fluid" or a "fluid at supercritical conditions" as used herein, is any substance at a temperature and pressure above its thermodynamic critical point. Supercritical fluids can be regarded as "hybrid solvents" with properties between those of gases and liquids, i.e., a solvent with a low viscosity, high diffusion rates and no surface tension. The most common are carbon dioxide ($CO_2$) at supercritical conditions and water at supercritical conditions. For example, the critical temperature of $CO_2$ is 31.1° C., and the critical pressure of $CO_2$ is 72.9 atm (7.39 MPa).

The term "mechanical stress," as used herein, refers to structural stresses within the shale formation that result from pressure variations within the formation. Such stress can lead to fracturing and/or rubblization of the shale formation.

The term "thermal stress," as used herein, refers to structural stresses within the shale formation that result from thermal variations. Such thermal stresses can induce internal mechanical stresses as a result of differences in thermal coefficients of expansion among the various components of the shale formation. Like mechanical stress mentioned above, thermal stress can also lead to fracturing and/or rubblization of the shale formation.

The term "fracturing," as used herein, refers to the structural degradation of a subsurface shale formation as a result of applied thermal and/or mechanical stress. Such structural degradation generally enhances the permeability of the shale to fluids and increases the accessibility of the kerogen component to such fluids. The term "rubblization," as used herein, is a more extensive fracturing process yielding fracture planes in multiple directions that generate shale derived "rubble."

The term "cracking," as mentioned in the background section and as used herein, refers to the breaking of carbon-carbon bonds in the kerogen so as to yield species of lower molecular weight. "Retorting," provides thermal cracking of the kerogen. "Upgrading," provides cracking of the kerogen, but can involve a thermal or chemical upgrading agent. Accordingly, the term "thermal upgrading" is synonymous with the term "retorting."

Hydrocracking is a chemical reaction of liquid feed materials, including hydrocarbons, petroleum and other biologically derived material, in the presence of hydrogen and one or more catalysts, resulting in product molecules having reduced molecular weight relative to that of the liquid feed materials. Additional reactions, including olefin and aromatic saturation and heteroatom (including oxygen, nitrogen, sulfur and halogen) removal may also occur during hydrocracking.

The term "in situ," as used herein refers to the environment of the subsurface shale formation. The processes as disclosed herein involve in situ liquid phase chemistry.

The term "nano-scale" as used herein means smaller than microscopic in scale. The metal particulate catalysts utilized in the present methods contain nano-sized or smaller metal particles.

The term "commercial petroleum-based products," as used herein, refers to commercial products that include, but are not limited to, gasoline, aviation fuel, diesel, lubricants, petrochemicals, and the like. Such products can also include common chemical intermediates and/or blending feedstocks.

"Optional" or "optionally" means that the subsequently described event or circumstance may, but need not, occur, and that the description includes instances where the event or circumstance occurs and instances in which it does not.

Method Overview

The present invention is generally directed to methods for extracting a kerogen-based product from a subsurface shale formation comprising kerogen in an inorganic matrix. The methods include the steps of: providing a fluid comprising metal to the subsurface shale formation comprising kerogen in an inorganic matrix; providing a reducing agent to the subsurface shale formation; converting the kerogen by contacting the kerogen with a metal particulate catalyst formed from the metal; forming a mobile kerogen-based product; and recovering at least a portion of the mobile kerogen-based product. The methods rely on chemically modifying the shale-bound kerogen to render it mobile using the reducing agent and the metal particulate catalysts. The fluid comprising metal accesses all surface area of the kerogen accessible to a fluid and the metal is deposited on and/or adhered to the surface of the kerogen. The metal particulate catalysts catalyze reactions creating mobile kerogen-based products.

The kerogen has charged surface sites or sites that will complex with metal ions. These charged surface sites adsorb metal ions provided to the formation in the present methods.

The metal can be in the form of ionic metal, complexed metal, or encapsulated metal. Ionic metals are metals in their positive oxidation states, for example $Ni^{2+}$, $Ni^{1+}$, $Mo^{2+}$, $Cu^{2+}$, $Cu^{3+}$, $Fe^{2+}$, $Fe^{3+}$. A complexed metal is a chemical species consisting of a metal atom or ion bonded to surrounding molecules or ions. Various ligands or complexing agents may surround the metal atom, typically these are organic ligands. Complexed metals include, for example, iron polysaccharides and iron amino acid chelates. An encapsulated metal is a metal enclosed by a protective coating, shell, or membrane.

In the present methods, the reducing agents reacts with the metal to form metal particulate catalyst and the reducing agents can also participate directly in reactions with the kerogen.

The above-mentioned method may further comprise the step of increasing accessibility of the kerogen to the fluid comprising metal prior to providing the fluid to the subsurface shale. The step of increasing the accessibility of the subsurface shale may include a variety of techniques and/or technologies such as, but not limited to, explosive fracturing, hydraulic fracturing, thermal fracturing, propellants, and the like. Generally, any method of fracturing and/or rubblizing regions of the shale formation, so as to render the shale more permeable to fluids, is suitable. Such fracturing and/or rubblizing can also involve chemicals reactive to, e.g., at least part of the inorganic shale component.

The above-mentioned method also may comprise the step of preconditioning the kerogen in the shale formation prior to providing the fluid comprising metal. The step of preconditioning may include techniques such as, but not limited to, acidifying the inorganic matrix, extracting the extractable organics, oxidizing the kerogen, removing water from the formation, circulating a solvent to swell the kerogen, and combinations thereof. Generally, any method that makes the kerogen more accessible to the fluid and/or metal is suitable.

The step of contacting the kerogen with a fluid comprising metal generally involves an in situ chemical modification of the kerogen (e.g., reducing and cracking) so as to render the modified kerogen component mobile. The chemical reaction as described herein utilizes a reducing agent and metal particulate catalyst. Such chemical modification generally involves the breaking and/or making of chemical bonds. In embodiments, the chemical modification involves a reduction utilizing the reducing agent and metal particulate catalyst. At least a portion of these reaction products may be mobilized using a fluid. The fluid can be that present in the formation, including formation fluid and the fluid comprising metal provided to the formation. If needed to mobilize the reaction products an extraction fluid can also be provided to the formation. The step of transporting the mobile kerogen-based product out of the subsurface shale formation can generally be described as flowing the mobile kerogen-based product out of the subsurface formation, where it can be active (e.g., pumping) and/or passive.

In an embodiment, the step of recovering the product involves recovering the fluid comprising the mobile kerogen-based products at a surface facility. The fluid removed from the formation (e.g., by flowing or pumping) can be recovered as a syncrude or product can be separated from the fluid by extraction and/or separation. Product can be separated from the fluid flowing or pumped out of the formation using solvent extractions or by physical means, such as, for example, liquid-liquid separation, distillation, membrane separation, thermal separation processes, and the like.

In some embodiments, the recovered kerogen-based product is upgraded (thermally and/or chemically) in a surface facility to provide commercial products. Such surface upgrading can be intermediate to subsequent refining.

In some embodiments, the above-described method may involve one or more additional steps which serve to sample and subsequently analyze the shale prior to, or in the alternative during, or in the alternative after, performing the step of increasing the accessibility of the kerogen. Such sampling and analysis can have a direct bearing on the techniques employed in the subsequent steps.

Subsurface Shale Formation

The subsurface shale formation comprises an organic component, at least a portion of which is the kerogen as defined herein. The subsurface shale formation further comprises an inorganic component or inorganic matrix in addition to the kerogen. The subsurface shale formation may also comprise an extractible organic component, soluble in organic solvents, as defined herein.

Formation Fluid

The formation fluid is a fluid, generally an aqueous fluid, which is in contact with the kerogen in the subsurface shale formation. The formation fluid can be utilized in contacting the kerogen with the fluid comprising metal and in recovering the mobile kerogen-based products. The formation fluid may be present and in contact with the kerogen in the formation, in small quantities which merely wet the solid surfaces in the formation. Alternatively, the formation fluid may be present in sufficient quantities to flood the formation; or in any quantity between the wetted or flooded states.

Accessing the Subsurface Shale Formation

The subsurface shale formation is accessed from the surface through at least one well. In general, the well will be cased, at least for a portion of its distance. Specifications for drilling access wells into a subsurface shale formation are known. In most applications of the invention, multiple wells will be provided into the subsurface shale formation, the well pattern based on recognized principles for this application. In some embodiments, a portion of the wells are employed as injection wells for passing fluids from the surface to the formation, and a portion of the wells are employed as production wells for withdrawing fluids from the formation to the surface. Each of the multiple wells may be used successively as an injection well and a production well, depending on the needs of the process. In an alternative, each well may be prepared and managed optimally as either an injection well or a production well. Specifications of each well for preparing and using the well as an injection well and/or a production well can readily be developed by one of skill in the art.

Increasing Accessibility

In some embodiments, the step of increasing accessibility includes the sub-steps of: drilling a cased injection well into the subsurface shale formation comprising the subsurface shale; pressurizing the injection well with an aqueous fluid or water at pressures greater than the formation pressure, so as to create fractures and other voids in the formation.

In some embodiments, the step of increasing accessibility includes the sub-steps of: drilling a cased injection well into the subsurface shale formation comprising the subsurface shale; pressurizing and subsequently sealing the injection well with a dense phase fluid to provide a pressurized well; and rapidly de-pressurizing the pressurized well to reach a steady state reduced pressure. In some such embodiments, the sub-steps of pressurizing and de-pressurizing are repeated until an equilibrium pressure is reached.

The dense phase fluid can be any such fluid that suitably provides for increased accessibility of the kerogen to a fluid—typically due to fracturing and/or rubblizing of the shale in which the kerogen resides. In some embodiments, the dense phase fluid comprises a component selected from the group consisting of carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons (including, but not limited to, ethane, propane, butane, and combinations thereof), and the like.

In some embodiments, the pressure in the pressurized well exceeds the fracture pressure of the subsurface shale formation. Such formation fracture pressure could be ascertained beforehand, for example—thereby helping to direct the choice of variable parameters used in this step.

In some embodiments, the dense phase fluid is absorbed by the kerogen and the kerogen subsequently swells, and wherein the swollen kerogen expands the subsurface shale formation and creates mechanical stresses leading to subsequent fracturing and/or rubblization of the formation. In some such embodiments, the mechanical stresses created during the pressurizing and depressurizing sub-steps enhance fracturing and/or rubblization of the subsurface shale formation.

In some embodiments, the pressurizing and depressurizing sub-steps create thermal and/or mechanical stresses in the subsurface shale formation. In some such embodiments, the kerogen at least partially delaminates from the inorganic component of the shale as a result of the thermal stresses.

In some embodiments, explosives are added to the dense phase fluid to enhance rubblization and fracturing of the formation. Examples of such explosives include, but are not limited to, strongly oxidizing species, nitro-containing species (e.g., trinitrotoluene, nitroglycerine), thermite mixtures, and the like. The dense phase fluids to which such explosives can be added include, but are not limited to, carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons (including, but not limited to, ethane, propane, butane, and combinations thereof), and the like.

Preconditioning the Kerogen in the Subsurface Shale

In some embodiments the kerogen in the subsurface shale formation is preconditioned prior to providing a fluid comprising metal. Preconditioning can improve contact of the metal and/or metal particulate catalysts with the kerogen and as such, can increase product yields.

Preconditioning the kerogen in the subsurface shale formation can involve processes including acidifying the inorganic matrix, extracting the extractible organics, oxidizing the kerogen, removing water from the formation, circulating a solvent to swell the kerogen, and any combination thereof.

In some embodiments, the inorganic matrix of the subsurface shale formation is acidified. The inorganic matrix can be acidified by contacting with inorganic acids, organic acids, $CO_2$, $CO_2$ at supercritical conditions, or mixtures thereof. During the step of acidifying the inorganic matrix, the downhole pH can be monitored to determine the degree of acidification desired.

The kerogen in the subsurface shale formation can also be preconditioned by removing extractible organics. The subsurface shale formation may comprise an organic component that is at least partially soluble in an organic solvent; this component is referred to herein as "extractible organics". These extractible organics include what is commonly referred to as bitumen. In contrast, the kerogen is not soluble in organic solvents. In some embodiments, the subsurface shale formation comprises extractible organics associated with the kerogen. The extractible organics can exist as an oily layer on the kerogen and removing the extractible organics increases the accessible surface area of the kerogen and makes the kerogen more accessible to fluids and catalysts.

In the present methods, the extractible organics can be removed or extracted with a solvent, preferably a hydrocarbon solvent. Suitable or exemplary solvents for extracting the extractible organics include 2-methyltetrahydrofuran, tetrahydrofuran, dichloromethane, chloroform, methanol, ethanol, acetone, carbon disulfide, benzene, toluene, xylene, pyridine, n-methyl-2-pyrrolidone (NMP), cyclopentyl methyl ether (CPME), ethyl lactate, dibasic esters (DBE), propylene carbonate, dimethyl carbonate, $CO_2$, $CO_2$ at supercritical conditions, and mixtures thereof. The hydrocarbon solvent can be contacted with the easily extractible organics on the surface of the kerogen by circulating the solvent through the formation.

In some embodiments, suitable solvents for extracting the extractible organics include 2-methyltetrahydrofuran, methanol, ethanol, acetone, ethyl lactate, dibasic esters (DBE), propylene carbonate, dimethyl carbonate, $CO_2$, $CO_2$ at supercritical conditions, and mixtures thereof. In certain embodiments, environmentally benign or green solvents are utilized.

The solvent can be provided to the formation and the extractible organics are absorbed into the solvent. The solvent containing the extractible organics can then be withdrawn from the formation. Withdrawing the solvent containing the extractible organics can generally be described as flowing the solvent out of the subsurface formation, where it can be active (e.g., pumping) and/or passive. If desired, the extractible organics can be isolated from the solvent at a surface facility.

Removal of the extractible organics component can be performed as described in U.S. application Ser. No. 13/335, 195, entitled "Preconditioning a Subsurface Shale Formation by removing Extractible Organics" filed Dec. 22, 2011, the contents of which is incorporated herein by reference in its entirety.

In some embodiments, the kerogen in the subsurface shale formation can also be preconditioned by removing water from the subsurface formation. Water can be removed by any known method for removing water from a subsurface formation, including circulating liquids and/or gases through the formation. For example, ethanol, supercritical $CO_2$, one followed by the other, or mixtures thereof can be circulated through the formation, displacing any water in the formation, and thus removing water from the subsurface formation.

The kerogen in the subsurface shale formation can further be preconditioned by contacting the kerogen with a swelling agent. The kerogen can be contacted with a swelling agent by circulating a solvent known to swell kerogen through the formation. The swelling agent can be a liquid or a gas. The swelling agent is circulated through the formation, swelling the kerogen and increasing its surface area accessible for deposition of the metal and/or metal particulate catalyst.

The swelling agent can be selected from the group consisting of $CO_2$, $CO_2$ at supercritical conditions, ethanol, carbon disulfide, o-dichlorobenzene, nitrobenzene, biphenyl, propionitrile, nitroethane, acetonitrile, chloroacetonitrile, nitromethane, pyridine, 1,2-dibromoethane, 2-propanol, dimethyl sulfoxide, methanol, and mixtures thereof. In some embodiments, the swelling agent can be selected from the group consisting of $CO_2$, $CO_2$ at supercritical conditions, ethanol, acetonitrile, 2-propanol, dimethyl sulfoxide, methanol, and mixtures thereof. For example, $CO_2$, ethanol, or mixtures thereof can be used as swelling agents. In certain embodiments, environmentally benign or "green" swelling agents are utilized.

In some embodiments, the kerogen in the subsurface shale formation can also be preconditioned by oxidizing the kerogen. In embodiments where an oxidizing preconditioning step is utilized, the methods further comprise the step of contacting the kerogen with an oxidizing agent. Oxidation can assist the presently claimed methods by activating the kerogen surface, creating additional accessible surface area, and/or creating coordination sites on the kerogen surface for enhanced catalytic metal deposition. Oxidation may also create some kerogen-based reaction products containing oxygen which are mobile. These products can be recovered when formed during oxidation or in a later step with the mobile kerogen-based products of the present process.

The oxidizing agent is selected to be sufficiently stable to be delivered to the kerogen, while maintaining sufficient oxidation activity to oxidize the kerogen. In embodiments, the oxidizing agent is selected to be environmentally benign. In embodiments, the oxidizing agent is selected to minimally impact aqueous aquifers in the region of the kerogen in the subsurface shale. The oxidizing agent may be a single oxidant or an oxidant blend. In embodiments, the oxidizing agent is selected to be stable in an aqueous fluid. In some such embodiments, the particular oxidizing agent or oxidant blend, along with the concentration of the oxidizing agent or oxidant blend in the formation fluid, is established by the reactivity of the kerogen in the presence of the formation fluid.

The oxidizing agent can be selected from the group consisting of $O_2$, ozone, peroxides, organic and inorganic acids, metal oxides, permanganates, and persulfates. In one embodiment the oxidizing agent can be selected from $O_2$, ozone, peroxides, peracetic acid, permanganates, persulfates, hypochlorite, nitrous oxide, nitric acid, hexavalent chromium compounds, Fenton's reagent, silver oxide, osmium tetroxide, and mixtures thereof. Fenton's reagent is a combination of hydrogen peroxide with an iron ($Fe_2^+$) catalyst.

In certain embodiments the oxidizing agent can be selected from the group consisting of consisting of hydrogen peroxide, $O_2$, ozone, benzoyl peroxide, permanganates, persulfates, hypochlorite, nitrous oxide, and mixtures thereof.

Peracetic acid, also known as peroxyacetic acid ($CH_3CO_3H$), is formed by reacting acetic acid with hydrogen peroxide. It is acidic as prepared, and will generally be provided to the formation fluid in acidic solution. In embodiments, the process comprises contacting kerogen with a formation fluid containing peracetic acid.

In embodiments, hydrogen peroxide ($H_2O_2$) is provided to the formation fluid in pure form, or combined with an amount of inhibitor to prevent premature decomposition of the hydrogen peroxide before contact with kerogen. In embodiments, the process comprises contacting kerogen with a formation fluid containing hydrogen peroxide.

Benzoyl peroxide ($[C_6H_5C(O)]_2O_2$) is minimally soluble in aqueous solution; this oxidant can be supplied to the kerogen in either an organic fluid or as a slurry in an aqueous fluid. The slurry may be formed by directly slurrying the benzoyl peroxide into the aqueous fluid; or the benzoyl peroxide is first dissolved in an organic solvent and the solution used to form the slurry.

The oxidizing agent concentration in the formation fluid is determined by a number of factors, including the stability and reactivity of the oxidizing agent at the conditions of the subsurface formation, and the nature of the inorganic component of the subsurface shale. In embodiments, the fluid containing oxidizing agent as provided to the subsurface shale formation contains in the range from 5 wt. % to 100 wt. % oxidizing agent; or in the range from 5 wt. % to 50 wt. % oxidizing agent; or in the range of 5 wt. % to 40 wt. % oxidizing agent.

The oxidizing can be performed at a temperature in the range of between about 0° C. and 200° C. In certain embodiments, the temperature is in the range of between about 20° C. and 150° C.

The oxidizing agent can be a liquid phase oxidant or a gas phase oxidant. For liquid phase oxidations, the kerogen can be dried with ethanol, $CO_2$, $CO_2$ at supercritical conditions, or mixtures thereof to swell the kerogen and maintain the swelled kerogen. The kerogen can then be contacted with the liquid phase oxidant. After contacting with the liquid oxidant, the kerogen can be flushed with a liquid or gaseous solvent to remove remaining oxidant and any reaction products. For gas phase oxidations, the kerogen can be dried with $CO_2$ or $CO_2$ at supercritical conditions to swell the kerogen and maintain the swelled kerogen. The kerogen can then be contacted with the gas phase oxidant. After contacting with the gas oxidant, the kerogen can be flushed with a non-reactive gas (such as carbon dioxide, hydrogen, nitrogen, or argon) to remove remaining oxidant and the kerogen can be further flushed with a liquid solvent to remove any reaction products.

As stated above, according to the present methods, the kerogen in the subsurface shale formation can be preconditioned by any one, or a combination or all of the above described preconditioning processes. If a combination or all of the above described preconditioning processes are utilized, the preconditioning processes can be performed in any order desired. If a combination of preconditioning processes are utilized which involve the use of a solvent or fluid, the same solvent or fluid can advantageously be utilized for the various preconditioning treatments. For example, if a combination of acidifying the inorganic matrix and contacting the kerogen with a swelling agent are utilized, then ethanol, $CO_2$, $CO_2$ at supercritical conditions, or combinations thereof can advantageously be utilized for both preconditioning processes.

In certain embodiments, the methods comprise a combination of extracting the extractible organics and oxidizing the kerogen. In other embodiments, the methods comprise a combination of extracting the extractible organics, contacting the kerogen with a swelling agent, and contacting the kerogen with an oxidizing agent.

Fluid Comprising Metal

According to the present invention, a fluid comprising metal is provided to the subsurface shale formation comprising kerogen in an inorganic matrix. The fluid is provided from the surface to the formation. An injection well may be utilized for passing the fluid from the surface to the formation. Specifications for such a well can readily be developed by one of ordinary skill in the art.

The fluid is selected to provide the metal to the formation, and to maintain the integrity of the metal until contacted with the kerogen and/or converted to metal particulate catalyst. The fluid should be appropriate for use with the metal, the reducing agent, and the metal particulate catalyst. The fluid may also be appropriate for combining with the formation fluid, if any is present. The fluid can be provided to the subsurface shale formation at a temperature in the range of between 0° C. and 200° C. and in certain embodiments at a temperature in the range of 20° C. and 150° C.

The metal can be combined with the fluid at the surface and then pumped into the formation. In other embodiments, the formation can be flooded with the fluid, accessing all surface area of the kerogen accessible to a liquid. Then fluid containing metal can be provided until a sufficient amount of metal has adhered to or been deposited on the surface of the kerogen.

Suitable or exemplary fluids can be selected from the group consisting of water, ethanol, carbon disulfide, o-dichlorobenzene, nitrobenzene, biphenyl, propionitrile, nitroethane, acetonitrile, chloroacetonitrile, nitromethane, pyridine, 1,2-dibromoethane, 2-propanol, dimethyl sulfoxide, methanol, and mixtures thereof. In some embodiments, the fluid can be selected from the group consisting of water, ethanol, acetonitrile, 2-propanol, dimethyl sulfoxide, methanol, and mixtures thereof. In certain embodiments the fluid is ethanol. In certain instances the fluid can selected to be environmentally benign.

The fluid can also be used for providing the reducing agent to the subsurface shale formation.

The fluid can be provided to the formation at a temperature in the range of between 0° C. and 200° C. In one embodiment, the fluid is provided a temperature in the range of between 20° C. and 150° C. In some embodiments, the fluid is provided at a temperature in one of the following ranges: between 20° C. and 150° C.; between 20° C. and 100° C.; or between 25° C. and 75° C.

Metal

According to the methods disclosed herein, a fluid comprising metal is provided to the subsurface shale formation comprising kerogen accessing all surface area of the kerogen accessible to a liquid.

The metals contained in the fluid provided to the subsurface shale formation form metal particulate catalysts. The metal particulate catalysts are utilized in in-situ reactions to form mobile kerogen-based products. The metals can be in the form of ionic metals, complexed metals, or encapsulated metals. Ionic metals are metals in their positive oxidation states. A complexed metal is a chemical species consisting of a metal atom or ion bonded to a surrounding molecules or ions. Various ligands or complexing agents may surround the metal atom, typically these are organic ligands. Complexed metals include, for example, iron polysaccharides and iron amino acid chelates. An encapsulated metal is a metal enclosed by a protective coating, shell, or membrane.

The subsurface shale formation is flooded with the fluid containing the metal. The metals can be any metal suitable for forming a metal particulate catalyst that will react with the kerogen to create a mobile-kerogen based product. In the methods, the metal can be a transition metal. In certain embodiments, suitable metals include Group VI metals, Group VIII metals, and coinage metals. Group VI metals refer to any one or more of chromium, molybdenum, and tungsten. Group VIII metals refer to any noble or non-noble Group VIII metal, including any one or more of iron, ruthenium, osmium, hassium, cobalt, rhodium, iridium, nickel, palladium, and platinum. Coinage metals refer to any one or more of copper, silver, and gold.

In certain embodiments, the metal can be selected from the group consisting of Ni, Fe, Cu, Co, Mo, Ag, Pt, Au, and mixtures thereof.

In an embodiment ionic metals are used. The ionic metals can be deposited on the surface of the kerogen. The ionic metals utilized can be selected from the group consisting of $Ni^{2+}$, $Ni^{1+}$, $Mo^{2+}$, $Cu^{2+}$, $Cu^{3+}$, $Fe^{2+}$, $Fe^{3+}$, and mixtures thereof. In one embodiment, the ionic metal is $Ni^{2+}$.

The metal can be combined with the fluid at the surface and then pumped into the formation. In other embodiments, the formation can be flooded with the fluid, accessing all surface area of the kerogen accessible to a liquid. Then fluid containing ionic metal can be provided until a sufficient amount of metal has been deposited on or adhered to the surface of the kerogen.

In the present methods, it is important that the metals or metal ions in the fluid are deposited on and/or adhered to the surface of the kerogen. As described herein, the kerogen can be preconditioned prior to providing the fluid containing metal ions to provide more surface area accessible to a liquid.

Reducing Agents

In the present methods a reducing agent is provided to the subsurface shale formation. The reducing agent can be combined with a fluid and pumped or injected into the formation or the reducing agent can be directly pumped or injected into the formation. The fluid can be the same or different from the fluid comprising metal.

The reducing agents react with the metal to form metal particulate catalyst and the reducing agents can also react directly with the kerogen in the presence of the metal particulate catalyst.

The reducing agent is selected to be sufficiently stable to be delivered to the kerogen, while maintaining sufficient reduction activity to reduce the metal and/or the kerogen. In some embodiments, the reducing agent can be selected to be environmentally benign. In embodiments, the reducing agent can be selected to minimally impact aqueous aquifers in the region of the kerogen in the subsurface shale. The reducing agent may be a single reducing agent or a blend.

In certain embodiments, the reducing agent can be stable in an aqueous fluid. In other embodiments, the reducing agent is soluble in an organic solvent that can also be utilized to mobilize the kerogen based reaction product. In some such embodiments, the particular reducing agent or blend, along with the concentration of the reducing agent or blend in the formation fluid, is established by the reactivity of the metal to forming a metal particulate catalyst and/or the kerogen. The reducing agent should not be so strong as to reduce the inorganic minerals in the subsurface shale formation.

The reducing agent can be selected from the group consisting of hydrogen, hydrazine, sodium borohydride ($NaBH_4$), hydrogen donor solvents, and mixtures thereof. The hydrogen donor solvents can be selected from the group consisting of decalin, tetralin, tetrahydroborane, and the like, and mixtures thereof.

In certain embodiments the reducing agent is hydrogen, hydrazine, or a mixture thereof. In one embodiment, the reducing agent is hydrazine, at least a portion of which is formed on site. Hydrazine may be formed at a surface facility from hydrogen peroxide and ammonia. Hydrazine also can be formed in situ in the formation from hydrogen peroxide and ammonia. For example, in certain embodiments the method can comprise the pretreatment step of oxidizing the kerogen using hydrogen peroxide as the oxidizing agent. If residual hydrogen peroxide remains in the formation, it may be used to form at least a portion of the hydrazine reducing agent. Ammonia and optionally additional hydrogen peroxide may be provided to the formation to provide at least a portion of the hydrazine reducing agent.

The reducing agent contacts with the metal (e.g., ionic metal) to form metal particulate catalyst. Kerogen is converted by contacting the kerogen with the metal particulate catalyst. Kerogen can also be converted by contacting the kerogen with the metal particulate catalyst in the presence of a reducing agent. The reducing agent can react to some degree directly with the kerogen.

In certain embodiments, two reducing agents can be used because reducing agent is needed to provide the metal particulate catalyst and reducing agent can also be useful in converting the kerogen to form mobile kerogen-based products. In these embodiments one reducing agent is utilized to react with the metal (e.g., ionic metal) to form metal particulate catalyst and one reducing agent is utilized with the metal particulate catalyst to contact the kerogen to form mobile kerogen-based products. The second reducing agent can be a milder reducing agent compared to the first reducing agent. The first and second reducing agents can be the same or different. The first reducing agent can be selected from the group consisting of hydrazine, sodium borohydride, hydrogen, and mixtures thereof and the second reducing agent can be selected from the group consisting of hydrogen, hydrazine, hydrogen donor solvent, and mixtures thereof.

A gas phase reduction or liquid phase reduction can be utilized. In gas phase reduction, hydrogen can be used as the reducing agent. In liquid phase reduction, decalin, tetralin, tetrahydroborane, hydrazine, and mixtures thereof can be used as the reducing agent.

To form the nano-scale or smaller metal particles of the metal particulate catalyst, slow reduction rates and dilute solutions can be utilized. A method can be utilized for downhole monitoring of the reduction process.

Metal Particulate Catalyst

In the methods disclosed herein, metal particulate catalysts are formed by reaction of the metal with reducing agent. The reducing agent reacts with the metal to form the metal particulate catalyst in situ in the formation. In certain embodiments, ionic metal is contacted with a reducing agent to form metal particulate catalyst in situ in the formation. According to the methods disclosed herein, the metal particulate catalysts surprisingly can be used for in-situ reaction of kerogen to create mobile kerogen-based products.

The methods as disclosed herein rely on chemically modifying the shale-bound kerogen to render it mobile using the metal particulate catalysts. The metal particles of the metal particulate catalysts are nano-scale or smaller and these catalysts surprisingly can be used for in-situ reaction of kerogen to create mobile kerogen-based products.

The metal particulate catalyst converts the kerogen by reaction involving reduction and hydrocracking. The metal particulate catalysts assist in starting the kerogen conversion reaction. The mobile-kerogen based products comprise primarily paraffins, including n-paraffins and isoparaffins, with low amounts of heteroatoms, including nitrogen, oxygen, and sulfur. The mobile kerogen based products further comprise low amounts of aromatics and oxygenates, including alcohols, acids, esters, and the like.

The metal particulate catalysts contain nano sized or smaller metal particles. In some embodiments, the catalyst comprises clusters of less than 100 metal atoms, for example at least 50 weight % of the metal particulate catalyst is in clusters having fewer than 100 metal atoms. In certain embodiments, the catalyst comprises clusters of less than 25 metal atoms, for example at least 50 weight % of the metal particulate catalyst is in clusters having fewer than 25 metal atoms. In other embodiments, the catalyst comprises clusters of less than 20 metal atoms for example at least 50 weight % of the metal particulate catalyst is in clusters having fewer than 20 metal atoms. In further embodiments, the catalyst comprises clusters of less than 10 metal atoms, for example at least 50 weight % of the metal particulate catalyst is in clusters having fewer than 10 metal atoms.

In certain embodiments at least 50 weight % of the metal particulate catalyst can be in clusters having 10 to 20 metal atoms or fewer.

Examples of catalysts containing nano-sized or smaller metal particles and processes for forming are described in Rodriguez-Vazques, M. J., et al., "Synthesis and characterization of gold atomic clusters by the two-phase method" Eur. Phys. J. D. 52; 23-26 (2009); Ledo-Suarez, Ana, et al., "Facile Synthesis of Stable Subnanosized Silver Clusters in Microemulsions", Angew. Chem. Int. Ed. 2007, 46, 8823-8827; and Guillen-Villafuerte, Olmedo, "Assembly of Subnanometric 2D Pt Nanoislands in Parallel Rows onto Au(111) by Self-Organization of Pt Clusters", Angew. Chem. Int. Ed. 2006, 45, 4266-4269.

The metal particulate catalysts are deposited on and/or adhered to the surface of the kerogen.

Converting the Kerogen and Forming a Mobile Kerogen-Based Product

The metal and/or metal particulate catalysts deposit on and/or are adhered to the surface of the kerogen, and the metal particulate catalysts catalyze reduction and hydrocracking reactions creating mobile kerogen-based products. The reducing agents react with the metal to form the metal particulate catalysts and the reducing agents can also react directly with the kerogen in the presences of the metal particulate catalyst. The metal particulate catalysts assist in starting the kerogen conversion reactions. The mobile-kerogen based products comprise primarily paraffins, including n-paraffins and isoparaffins, with low amounts of heteroatoms, including nitrogen, oxygen, and sulfur. The mobile kerogen based products further comprise low amounts of aromatics and oxygenates, including alcohols, acids, esters, and the like.

In embodiments, the catalytic conversion of the kerogen by contacting with the metal particulate catalyst is maintained until a target amount of mobile reaction products are produced and/or are absorbed into the fluid. The fluid present may be the fluid comprising metal provided to the formation, may be formation fluid, or fluid provided as an extraction fluid. Progress toward reaching the target amount may be monitored, for example, by withdrawing the fluids to the surface for analysis, by analyzing the fluids in the subsurface shale formation, or by analyzing the fluids in a well extending into the formation.

The process may further include monitoring the extent of reaction of the kerogen. For example, a fluid sample, such as the formation fluid, may be removed from the subsurface shale formation and analyzed. Alternatively, the progress of the reaction may be monitored using a downhole analyzer. An analyzer suited to determining the extent of reaction may be inserted into, or intimately contacted with the fluids in the subsurface shale formation.

In other embodiments, the process further comprises monitoring the kerogen conversion using the amount of mobile reaction products in the subsurface shale formation. The amount of mobile reaction products may be determined from an analysis of fluids recovered from the formation, or from a downhole analysis tool suited for analyzing the amount of reaction products.

In some embodiments, the catalytic conversion is continued for a specified time. The catalytic conversion can be continued for a specified number of hours, days, weeks, or months. Additional fluid comprising metal and/or reducing agent may be provided to the formation during the conversion.

Reaction Conditions

In some embodiments, reaction conditions for converting kerogen into the mobile kerogen-based product are selected to minimize the environmental effects of the process for extracting the kerogen-based product; and/or to maximize the conversion of kerogen into the mobile kerogen-based product; and/or to minimize the conversion of the kerogen to $CO_2$.

Reaction Temperature

The step of converting the kerogen with the metal particulate catalysts is generally conducted at or near natural formation temperature. In embodiments, the contacting occurs at a temperature below pyrolysis temperature of the kerogen. In embodiments, the contacting occurs at a temperature in the range of between 0° C. and 200° C. In one embodiment, the contacting occurs at temperatures of 20° C. to 150° C. In some such embodiments, the contacting occurs at a temperature in one of the following ranges: between 20° C. and 150° C.; between 20° C. and 100° C.; or between 25° C. and 75° C.

In a non-limiting specific example, the contacting is conducted at a temperature of less than 50° C. above the natural formation temperature. The natural formation temperature, as used herein, is the temperature of the subsurface shale formation, in the region of the kerogen, prior to human intervention with or in the formation. Methods for determining natural formation temperature are well known to those of skill in the art. Pyrolysis temperature, as used herein, is the temperature at which the kerogen thermally decomposes without the intervention of a catalytic or chemical agent. In the methods herein, the contacting occurs at a temperature below a pyrolysis temperature of the kerogen.

In some embodiments, the contacting is conducted under conditions in which no added heat is supplied to the formation fluid and/or to the subsurface shale in contact with the formation fluid. In some embodiments, if heat is supplied during the kerogen conversion to meet the above-mention target temperature, it can be supplied by recirculating heating fluids. As such, no oxidative heating is used. The contacting occurs at temperature below pyrolysis temperature of the kerogen.

Reaction Pressure

Generally, the kerogen in the subsurface shale is contacted with the metal particulate catalyst at or above natural formation pressure (i.e., the pressure of the subsurface shale formation in the region that includes the kerogen), so as to maintain or increase the accessibility of the catalyst to kerogen in the subsurface shale formation.

Methods for determining the formation pressure and the formation fracture pressure are known. In some such embodiments, the pressure can be up to 1000 psig; or up to 750 psig; or up to 500 psig; or even up to 250 psig above the natural formation pressure. The natural formation pressure, as used herein, is the pressure of the subsurface shale formation, in the region of the kerogen, prior to human intervention with or in the formation. Methods for determining a natural formation pressure are known.

Recovery of the Mobile Kerogen-Based Products

The mobile kerogen-based products produced are recovered from the formation at a surface facility. The mobile kerogen-based products can be allowed to flow to the surface or can be recovered by pumping. In certain embodiments an extraction fluid can be utilized to assist in recovering the mobile kerogen-based products. The extraction fluid can be any suitable fluid, including a fluid selected from those for providing the metal or formation fluid. Suitable or exemplary extraction fluids can be selected from the group consisting of ethanol, carbon disulfide, o-dichlorobenzene, nitrobenzene, biphenyl, propionitrile, nitroethane, acetonitrile, chloroacetonitrile, nitromethane, pyridine, 1,2-dibromoethane, 2-propanol, dimethyl sulfoxide, methanol, and mixtures thereof. In some embodiments, the fluid can be selected from the group consisting of ethanol, acetonitrile, 2-propanol, dimethyl sulfoxide, methanol, and mixtures thereof. In certain embodiments the extraction fluid is chosen to be the same as the fluid for providing the metal. In some embodiments the fluid can be environmentally benign.

In some embodiments, pumping is used to transport the mobile kerogen-based product out of the subsurface shale formation, wherein such pumping can be performed using techniques known to those of skill in the art. Conventional oil field practices (both flowing gas and pumping fluids, e.g., rod pumps, electrical submersible pumps, progressive cavity pumps, etc.) can be modified to provide reliability in a given producing environment. For example, modifications may require changes in metallurgy, pressure limitations, elastomeric compositions, temperature rating, and the like.

Production could use any standard producing process such as, but not limited to, at least one well penetrating into the subsurface shale formation as an injection well for providing fluids to the subsurface shale formation and at least one well penetrating into the subsurface shale formation as a production well for producing fluids from the formation, Huff-n-Puff (i.e., a single well is used as both the producer and injector), water flooding, steam flooding, polymer flooding, solvent extraction flooding, thermal processes, diluent addition, steam assisted gravity drainage (SAGD), and the like.

The fluid removed from the formation (e.g., by flowing or pumping) can be recovered as a syncrude or product can be separated from the fluid by extraction and/or separation. Product can be separated from the fluid flowing or pumped out of the formation using solvent extractions or by physical means, such as, for example, liquid-liquid separation, distillation, membrane separation, thermal separation processes, and the like.

The mobile-kerogen based products comprise primarily paraffins, including n-paraffins and isoparaffins, with low amounts of heteroatoms, including nitrogen, oxygen, and sulfur. The mobile kerogen based products further comprise low amounts of aromatics and oxygenates, including alcohols, acids, esters, and the like.

Surfactants

In certain embodiments, the fluids of the methods disclosed herein contain one or more surfactants or emulsifiers. For example, the fluid comprising metal can also comprise one or more surfactants or emulsifiers. In other embodiments surfactants can be utilized in the fluids recovering the mobile kerogen-based products. The surfactant can be any substance that reduces surface tension of the fluid, or reduces interfacial tension between two liquids, or one liquid and the surrounding formation. The surfactant can also be chosen, for example, to increase the accessibility of the fluid to the kerogen, and/or to increase the mobility of the reaction products from the kerogen, and/or to increase the effectiveness of the fluid for absorbing the reaction products. Suitable surfactants for use in the present fluids may be selected from nonionic, anionic or amphoteric surfactants.

In embodiments, the fluid can contain at least 2.5 wt. %; or from 2.5% to 10 wt. %; or from 2.5% to 8 wt. % of surfactant.

Products

The fluid removed from the formation (e.g., by flowing or pumping) can be recovered as a syncrude or a syncrude product can be separated from the fluid by extraction and/or separation at a surface facility. The kerogen derived products formed comprise primarily paraffins, including n-paraffins and isoparaffins. The syncrude is a suitable feedstock for refining, petrochemical and power generating facilities. These kerogen-based products have a lower molecular mass than the naturally occurring kerogen itself, and with the characteristic chemical and conformational complexity of the kerogen structures from which they are derived. The kerogen-based products can be transported by pipeline or shipped in tankers, either by tanker or ship.

Upgrading the Extracted Kerogen-Based Product

As described, a kerogen-derived syncrude is recovered from the formation or separated from the fluid recovered from the formation. In further embodiments, the kerogen-derived syncrude is upgraded to yield one or more commercial petroleum-based products. Various techniques common in the industry (e.g., hydroprocessing, hydrogenation, saturation, hydrotreating, hydrocracking, isomerization, fluid catalytic cracking, thermal cracking, esterification, oligomerization, reforming, alkylation, denitrification and desulfurization) may be employed to obtain a desired commercial product from the kerogen-derived product. Such upgrading is largely dependent on the nature of the kerogen-derived product and the commercial product desired.

The kerogen-derived products can be used, for example, in the production of fuels, lubricant and lubricant base oils, polymers, pharmaceuticals, solvents, petrochemicals and food additives. The kerogen-derived products can be upgraded and optionally used with additives, and/or other base oils, to make a finished lubricant. The finished lubricants can be used in passenger car motor oils, industrial oils, and other applications. When used for passenger car motor oils, base oils meet the definitions of the current version of API Base Oil Interchange Guidelines 1509.

In embodiments, at least some of the kerogen-derived products are used as feedstocks to make distillate fuels, generally boiling in the range of about $C_5$-700° F. (121°-371° C.) as determine by the appropriate ASTM test procedure. The term "distillate fuel" is intended to include gasoline, diesel, jet fuel and kerosene boiling range fractions. The kerosene or jet fuel boiling point range is intended to refer to a temperature range of about 280°-525° F. (138°-274° C.) and the term "diesel boiling range" is intended to refer to hydrocarbon boiling points of about 250°-700° F. (121°-371° C.). Gasoline or naphtha is normally the $C_5$ to 400° F. (204° C.) endpoint fraction of available hydrocarbons. The boiling point ranges of the various product fractions recovered in any particular refinery or synthesis process will vary with such factors as the characteristics of the source, local markets, product prices, etc. Reference is made to ASTM standards D-975, D-3699-83 and D-3735 for further details on kerosene, diesel and naphtha fuel properties.

Hydrotreating

In embodiments, the kerogen-derived products are upgraded in a hydrotreating reaction zone to remove heteroatoms such as oxygen, nitrogen and sulfur and to saturate olefins and aromatics. Hydrotreating conditions include a reaction temperature between 400° F.-900° F. (204° C.-482° C.), or between 650° F.-850° F. (343° C.-454° C.); a pressure between 500 to 5000 psig (pounds per square inch gauge) (3.5-34.6 MPa), or between 1000 to 3000 psig (7.0-20.8 MPa); a feed rate (LHSV) of 0.5 hr−1 to 20 hr−1 (v/v); and overall hydrogen consumption 300 to 2000 scf per barrel of liquid hydrocarbon feed (53.4-356 m3 H2/m3 feed). The hydrotreating catalyst will generally be a composite of a Group VI metal or compound thereof, and a Group VIII metal or compound thereof supported on a porous refractory base such as alumina. Examples of hydrotreating catalysts are alumina supported cobalt-molybdenum, nickel sulfide, nickel-tungsten, cobalt-tungsten and nickel-molybdenum. Other examples of hydrotreating catalysts contain a platinum group metal such as platinum and/or palladium. Typically such hydrotreating catalysts are presulfided.

Hydrocracking

In embodiments, the kerogen-derived products are hydrocracked. The hydrocracking reaction zone is maintained at conditions sufficient to effect a boiling range conversion of the products in the hydrocracking reaction zone, so that the liquid hydrocrackate recovered from the hydrocracking reaction zone has a normal boiling point range below the boiling point range of the feed. The hydrocracking step reduces the size of the hydrocarbon molecules, hydrogenates olefin bonds, hydrogenates aromatics, and removes traces of heteroatoms resulting in an improvement in fuel or base oil product quality.

Typical hydrocracking conditions include a reaction temperature between 400° F. and 950° F. (204° C.-510° C.) or between 650° F. and 850° F. (343° C.-454° C.); a reaction pressure between 500 and 5000 psig (3.5-34.5 MPa) or between 1500 and 3500 psig (10.4-24.2 MPa); a feed rate (in terms of volumes of feed at ambient conditions per volume of catalyst per hour) between 0.1 and 15 hr−1 (v/v) or between 0.25 and 2.5 hr−1; and hydrogen consumption 500 to 2500 scf per barrel of liquid hydrocarbon feed (89.1-445 m3 $H_2$/m3 feed). Generally, more severe conditions within these ranges will be used with higher boiling feedstocks and depending on whether gasoline, middle distillate or lubricating oil is desired as the primary economic product. The hydrocrackate is then separated into various boiling range fractions. The separation is typically conducted by fractional distillation preceded by one or more vapor-liquid separators to remove hydrogen and/or other tail gases.

The hydrocracking catalyst generally comprises a cracking component, a hydrogenation component and a binder. Such catalysts are well known in the art. The cracking component may include an amorphous silica/alumina phase and/or a zeolite, such as a Y-type or USY zeolite. The binder is generally silica or alumina. The hydrogenation component will be a Group VI, Group VII, or Group VIII metal or oxides or sulfides thereof, preferably one or more of molybdenum, tungsten, cobalt, or nickel, or the sulfides or oxides thereof. If present in the catalyst, these hydrogenation components generally make up from about 5% to about 40 wt. % of the catalyst. Alternatively, platinum group metals, especially platinum and/or palladium, may be present as the hydrogenation component, either alone or in combination with the base metal hydrogenation components molybdenum, tungsten, cobalt, or nickel. If present, the platinum group metals will generally make up from about 0.1% to about 2 wt. % of the catalyst.

Isomerization

In embodiments, the kerogen-derived products are hydroisomerized. Typical hydroisomerization conditions are well known in the literature and can vary widely. Isomerization processes are typically carried out at a temperature between 200° F. and 700° F. or between 300° F. to 650° F., with a feed rate between 0.1 and 10 hr−1 or between 0.25 and 5 hr−1. Hydrogen is employed such that the mole ratio of hydrogen to hydrocarbon is between 1:1 and 15:1. Catalysts useful for isomerization processes are generally bifunctional catalysts that include a dehydrogenation/hydrogenation component and an acidic component. The acidic component may include one or more of amorphous oxides such as alumina, silica or silica-alumina; a zeolitic material such as zeolite Y, ultrastable Y, SSZ-32, Beta zeolite, mordenite, ZSM-5 and the like, or a non-zeolitic molecular sieve such as SAPO-11, SAPO-31 and SAPO-41. The acidic component may further include a halogen component, such as fluorine. The hydrogenation component may be selected from the Group VIII noble metals such as platinum and/or palladium, from the Group VIII non-noble metals such as nickel and tungsten, and from the Group VI metals such as cobalt and molybdenum. If present, the platinum group metals will generally make up from about 0.1% to about 2 wt. % of the catalyst. If present in the catalyst, the non-noble metal hydrogenation components generally make up from about 5% to about 40 wt. % of the catalyst.

FCC

In embodiments, the kerogen-derived products are cracked in a fluid catalytic cracking unit (FCC). In such fluidized catalytic cracking, high molecular weight hydrocarbon liquids and vapors are contacted with hot, finely divided solid catalyst particles in an elongated riser or transfer line reactor. The transfer line is usually in the form of a riser tube and the contacting time is on the order of a few seconds, say from 0.5 to 8 seconds, and generally not over about 4 seconds. During this short period, catalysts at temperatures in the range about 1100° F. to 1400° F. are contacted with a hydrocarbon feedstock which is heated to a temperature of about 300° F. to 800° F. The reaction is one of essentially instantaneous generation of large volumes of gaseous hydrocarbons. The hydrocarbons and catalyst mixture flows out of the riser tube into a reactor vessel wherein the resultant gaseous hydrocarbons are taken off for distillation into various product fractions defined by boiling ranges. The spent catalyst is then separated in the reactor vessel and stripped of hydrocarbons by passing the catalyst through a stripper section which includes steam flowing up through the down-flowing catalyst usually for a period of 1 to 3 minutes. Catalyst is then returned to a regenerator where residual hydrocarbons, called "coke", on the spent catalyst are burned off by passing a stream of an oxygen-containing gas, such as air, or oxygen-enriched air, through the catalyst until substantially all the carbon is burned from the particles. The heat generated in this regeneration step is used as a heat source to heat the catalyst and thus provide elevated temperatures needed for reaction with the incoming hydrocarbon feed. Regenerated hot catalyst is then recycled to the riser cracking zone wherein the feed is cracked to form more gaseous products. In one embodiment, the fluid catalytic cracking reaction of the organic acids is conducted at a temperature of between 1200° F. and 1400° F. (600° C. to 800° C.). In another embodiment the fluid catalytic cracking reaction of the organic acids is conducted at a temperature of between 250° C. and 490° C.

A typical catalyst comprises 10%-60% w/w of a solid acid, 0%-50% w/w of alumina, 0%-40% w/w of silica, the remainder being kaolin. The solid acid may be a zeolite of the ZSM type, a zeolite of the faujasite type, a zeolite of the mordenite type, silico-aluminum phosphate (SAPO) or aluminum phosphate (ALPO).

Many refineries operate a single reactor for fluid catalytic cracking of gas oil or residue. In some situations, refineries may employ an FCCU possessing two reactors working in simultaneous operation. In such units the streams of spent catalyst from two reactors are mixed in the same rectification section having a single regenerator to burn off coke deposited on the catalyst. In addition such reactors may function in an independent manner with respectively different types of charge and differing reaction temperatures. The reaction severity applied to each reactor may be totally different, making it possible to adjust them to preestablished operational objectives. In this manner it is possible to carry out the processing of the organic acids under milder conditions, at temperatures between 250° C. and 490° C., for the production of diesel oil having a cetane number exceeding 40, while simultaneously carrying out the processing of conventional heavy gas oils or residues under more severe conditions, employing a single catalyst flow for both processes.

Exemplary Processes

In one embodiment the process for extracting a kerogen-based product from a subsurface shale formation comprises providing a fluid comprising at least one ionic metal to the subsurface shale formation comprising kerogen in an inorganic matrix. In this embodiment, the fluid is ethanol and the ionic metal is selected from the group consisting of $Ni^{2+}$, $Ni^{1+}$, $Mo^{2+}$, $Cu^{2+}$, $Cu^{3+}$, $Fe^{2+}$, $Fe^{3+}$, and mixtures thereof. In certain instances, the ionic metal is $Ni^{2+}$. The ionic metal is contacted with a reducing agent to form a metal particulate catalyst. In this embodiment, the reducing agent is hydrogen, hydrazine, or mixtures thereof. In certain instances, the hydrazine is formed in situ in the subsurface shale formation from hydrogen peroxide and ammonia. The kerogen is converted by contacting the kerogen with the metal particulate catalyst to form a mobile kerogen-based product. At least a portion of the mobile kerogen-based product is recovered by pumping. The mobile kerogen-based product is then upgraded at surface facilities to produce commercial products.

In another embodiment the process for extracting a kerogen-based product from a subsurface shale formation comprises providing a fluid comprising at least one ionic metal to the subsurface shale formation comprising kerogen in an inorganic matrix. In this embodiment, the fluid is ethanol and the ionic metal is selected from the group consisting of $Ni^{2+}$, $Ni^{1+}$, $Mo^{2+}$, $Cu^{2+}$, $Cu^{3+}$, $Fe^{2+}$, $Fe^{3+}$, and mixtures thereof. In certain instances, the ionic metal is $Ni^{2+}$. The ionic metal is contacted with a first reducing agent to form a metal particulate catalyst. The kerogen is converted by contacting the kerogen with the metal particulate catalyst in the presence of a second reducing agent to form a mobile kerogen-based product. The first reducing agent is hydrogen, hydrazine, or mixtures thereof and the second reducing agent is hydrogen, hydrazine, a hydrogen donor solvent or mixtures thereof. At least a portion of the mobile kerogen-based product is recovered by pumping. The mobile kerogen-based product is then upgraded at surface facilities to produce commercial products.

In a further embodiment the process for extracting a kerogen-based product from a subsurface shale formation comprises extracting extractible organics from the subsurface shale formation. In this embodiment the extractible organics can be extracted with 2-methyl tetrahydrofuran. The kerogen is then oxidized to activate the kerogen surface, create additional accessible surface area in the kerogen, and/or create coordination sites on the kerogen for enhanced metal deposition. In this embodiment, hydrogen peroxide can be used as the oxidizing agent. A fluid comprising at least one ionic metal is then provided to the subsurface shale formation comprising kerogen in an inorganic matrix. In this embodiment, the fluid is ethanol and the ionic metal is selected from the group consisting of $Ni^{2+}$, $Ni^{1+}$, $Mo^{2+}$, $Cu^{2+}$, $Cu^{3+}$, $Fe^{2+}$, $Fe^{3+}$, and mixtures thereof. In certain instances, the ionic metal is $Ni^{2+}$. The ionic metal is contacted with a reducing agent to form a metal particulate catalyst. In this embodiment, the reducing agent is hydrogen, hydrazine, or mixtures thereof. In certain instances, the hydrazine is formed on site at a surface facility or in situ in the subsurface shale formation from hydrogen peroxide and ammonia. Advantageously residual hydrogen peroxide from the oxidation pretreatment may be used in forming the hydrazine. The kerogen is converted by contacting the kerogen with the metal particulate catalyst to form a mobile kerogen-based product. At least a portion of the mobile kerogen-based product is recovered by pumping. The mobile kerogen-based product is then upgraded at surface facilities to produce commercial products.

In an exemplary process illustrated in the FIGURE, a fluid comprising at least one ionic metal is prepared in a preparation step 10 by mixing at least one ionic metal 2 with a carrier fluid 4, which may be aqueous or an alcohol. Mixing devices for mixing the ionic metal with the carrier fluid to make the fluid mixture 15 to be provided to the subsurface shale formation are well known.

The fluid mixture 15 is passed to the kerogen in the subsurface shale formation in step 20 via a first (e.g., injection) well that has been drilled to penetrate the subsurface formation to provide access to the kerogen within the formation.

A fluid comprising a reducing agent 6 is also prepared in a preparation step 12 by mixing a reducing agent 6 with a carrier fluid 8, which may be aqueous or alcohol and may be the same or different from the carrier fluid mixed with the ionic metal. Mixing devices for mixing the reducing agent with the carrier fluid to make the fluid mixture 14 are well known to those or ordinary skill in the art. Two different mixing devices (as illustrated) may be used for preparing the two fluids 14 and 15 or the same mixing device may be used.

The fluids 14 and 15 are passed to the subsurface shale formation by step 20 via a first (e.g., injection) well. Two different injection wells may be used or the same injection well (as illustrated) may be used. The fluids combine with a fluid already present in the subsurface shale formation to form a formation fluid 25, in contact with the kerogen. In one embodiment, the subsurface shale formation has been fractured to enhance the permeability of the shale to the oxidant and to increase the accessibility of the kerogen component to this fluid.

In step 30 the reducing agent is contacted with the ionic metal to form a metal particulate catalyst 35. In step 40 the metal particulate catalyst is contacted with the kerogen and converts the kerogen to produce a mobile kerogen-based product 45. In step 40 the reducing agent can also react directly with the kerogen. The mobile kerogen-based product is produced to the surface in step 50. In one embodiment, multiple fluid batches comprising ionic metal, and optionally multiple fluid batches comprising reducing agent, are provided to the subsurface shale formation, prior to recovery of the mobile kerogen-based product. The timing of each fluid addition depends, at least in part, on the progress of the kerogen conversion, and on the relative reactivity of the metal particulate catalyst in contact with the kerogen.

The mobile kerogen-based product produced at the surface is treated in step 60 for isolation and recovery of the hydrocarbons 65. In the illustrative process shown in FIG. 1, the hydrocarbons 65 isolated in step 60 are subjected to further processing or upgrading in step 70. A commercial product 75 is produced from the further processing or upgrading.

Variations

A variation (i.e., alternate embodiment) on the above-described process is the application of some or part of such above-described methods to alternative sources, i.e., low-permeability hydrocarbon-bearing (e.g., oil and gas) formations, in situ coal, in situ heavy oil, in situ oil sands, and the like. General applicability of at least some of the above-described invention embodiments to any hydrocarbon-bearing formation exists. Surface processing applications may include upgrading of oil shale, coal, heavy oil, oil sands, and other conventional oils with asphaltenes, sulfur, nitrogen, etc.

Various modifications and alterations of this invention will become apparent to those skilled in the art without departing from the scope and spirit of the invention. Other objects and advantages will become apparent to those skilled in the art from a review of the preceding description.

The invention claimed is:

1. A process for extracting a kerogen-based product from a subsurface shale formation comprising kerogen in an inorganic matrix, the process comprising the steps of:
   a) providing a fluid comprising an ionic metal, a complexed ionic metal, or an encapsulated ionic metal to the subsurface shale formation comprising kerogen in an inorganic matrix;
   b) providing a reducing agent to the subsurface shale formation, wherein the reducing agent reacts with the ionic metal, complexed ionic metal, or encapsulated ionic metal to form a metal particulate catalyst in situ in the formation;
      wherein at least 50 wt. % of the metal particulate catalyst is in clusters having fewer than 100 metal atoms;
   c) converting the kerogen by contacting the kerogen with the metal particulate catalyst formed from the metal;
   d) forming a mobile kerogen-based product; and
   e) recovering at least a portion of the mobile kerogen-based product;
   wherein the contacting of the kerogen with the metal particulate catalyst in step c) is performed without supplying added heat to the formation; and the metal in the fluid is an ionic metal, a complexed ionic metal, or an encapsulated ionic metal.

2. The process of claim 1, further comprising converting the kerogen by reaction of the kerogen with the metal particulate catalyst in the presence of the reducing agent to form the mobile kerogen-based product.

3. A process for extracting a kerogen-based product from a subsurface shale formation comprising kerogen in an inorganic matrix, the process comprising the steps of:
   a) providing a fluid comprising at least one ionic metal to the subsurface shale formation comprising kerogen in an inorganic matrix;
   b) contacting the ionic metal with a reducing agent to form a metal particulate catalyst in situ in the formation;
      wherein at least 50 wt. % of the metal particulate catalyst is in clusters having fewer than 100 metal atoms;
   c) converting the kerogen by contacting the kerogen with the metal particulate catalyst to form a mobile kerogen-based product; and
   d) recovering at least a portion of the mobile kerogen-based product;
   wherein the contacting of the kerogen with the metal particulate catalyst in step c) is performed without supplying added heat to the formation.

4. A process for extracting a kerogen-based product from a subsurface shale formation comprising kerogen in an inorganic matrix, the process comprising the steps of:
   a) providing a fluid comprising at least one ionic metal to the subsurface shale formation comprising kerogen in an inorganic matrix;
   b) contacting the ionic metal with a first reducing agent to form a metal particulate catalyst in situ in the formation;

wherein at least 50 wt. % of the metal particulate catalyst is in clusters having fewer than 100 metal atoms;

c) converting the kerogen by contacting the kerogen with the metal particulate catalyst in the presence of a second reducing agent to form a mobile kerogen-based product; and d) recovering at least a portion of the mobile kerogen-based product;

wherein the contacting of the kerogen with the metal particulate catalyst in step c) is performed without supplying added heat to the formation.

5. The process of claim 4, wherein the first reducing agent is selected from the group consisting of hydrazine, hydrogen, $NaBH_4$, and mixtures thereof and the second reducing agent is selected from the group consisting of hydrazine, hydrogen, a hydrogen donor solvent, and mixtures thereof.

6. The process of claim 3, further comprising the step of increasing accessibility of the kerogen to the fluid and ionic metal prior to providing the fluid to the subsurface shale formation.

7. The process of claim 6, wherein the increasing accessibility is performed by hydraulic fracturing, thermal fracturing, explosive fracturing, or combinations thereof.

8. The process of claim 3, further comprising the step of preconditioning the kerogen in the shale formation prior to providing the fluid to the subsurface shale formation.

9. The process of claim 8, wherein the preconditioning is a process selected from the group consisting of acidifying the inorganic matrix, extracting the extractible organics, oxidizing the kerogen, removing water from the formation, circulating a solvent to swell the kerogen, and combinations thereof.

10. The process of claim 9, wherein the preconditioning comprises acidifying the inorganic matrix.

11. The process of claim 10, wherein the inorganic matrix is acidified by contacting it with inorganic acids, organic acids, $CO_2$, $CO_2$ at supercritical conditions, or mixtures thereof.

12. The process of claim 9, wherein the preconditioning comprises extracting extractible organics from the subsurface shale formation.

13. The process of claim 12, wherein the extractible organics are extracted from the subsurface shale formation using a solvent selected from the group consisting of 2-methyl tetrahydrofuran, methanol, ethanol, acetone, cyclopentyl methyl ether (CPME), ethyl lactate, dibasic esters (DBE), propylene carbonate, dimethyl carbonate, $CO_2$, $CO_2$ at supercritical conditions, and mixtures thereof.

14. The process of claim 9, wherein the preconditioning comprises contacting the kerogen with a swelling agent.

15. The process of claim 14, wherein the swelling agent is selected from the group consisting of $CO_2$, $CO_2$ at supercritical conditions, ethanol, acetonitrile, 2-propanol, dimethyl sulfoxide, methanol, and mixtures thereof.

16. The process of claim 8, wherein the preconditioning comprises removing water from the formation prior to providing the fluid to the subsurface shale formation.

17. The process of claim 16, wherein the water is removed by circulating liquids and/or gases through the formation.

18. The process of claim 17, wherein the liquids and/or gases circulated are selected from the group consisting of ethanol, $CO_2$ at supercritical conditions, $CO_2$, or mixtures thereof.

19. The process of claim 8, wherein the preconditioning comprises oxidizing the kerogen.

20. The process of claim 19, wherein the oxidizing is performed by contacting the kerogen with an oxidizing agent selected from the group consisting of $H_2O_2$, $O_2$, ozone, benzoyl peroxide, permanganates, persulfates, hypochlorite, nitrous oxide, and mixtures thereof.

21. The process of claim 19, wherein the oxidizing is performed at a temperature of in the range of between 20° C. and 150° C.

22. The process of claim 3, wherein the metal is a transition metal.

23. The process of claim 3, wherein the metal is one or more metal selected from the group consisting of Cr, Mo, W, Fe, Ru, Os, Co, Rh, Ir, Ni, Pd, Pt, Cu, Ag and Au.

24. The process of claim 3, wherein the metal is selected from the group consisting of Ni, Fe, Cu, Co, Mo, Ag, Pt, Au, and mixtures thereof.

25. The process of claim 24, wherein the metal is selected from the group consisting of $Ni^{2+}$, $Ni^{1+}$, $Mo^{2+}$, $Cu^{2+}$, $Cu^{3+}$, $Fe^{2+}$, $Fe^{3+}$, and mixtures thereof.

26. The process of claim 25, wherein the ionic metal is $Ni^{2+}$.

27. The process of claim 3, wherein the ionic metal is deposited on the kerogen.

28. The process of claim 3, wherein the metal particulate catalyst is deposited on the kerogen.

29. The process of claim 3, wherein the fluid is selected from the group consisting of water, ethanol, acetonitrile, 2-propanol, dimethyl sulfoxide, methanol, and mixtures thereof.

30. The process of claim 3, wherein the reducing agent is selected from the group consisting of hydrogen, hydrazine, sodium borohydride ($NaBH_4$), a hydrogen donor solvent, and mixtures thereof.

31. The process of claim 30, wherein the reducing agent is hydrazine formed in the subsurface shale formation from hydrogen peroxide and $NH_3$.

32. The process of claim 30, wherein the hydrogen donor solvent is selected from the group consisting of decalin, tetralin, tetrahydroborate, and mixtures thereof.

33. The process of claim 3, wherein at least 50 wt. % of the metal particulate catalyst is in clusters having fewer than 20 metal atoms.

34. The process of claim 3, wherein at least 50 wt. % of the metal particulate catalyst is in clusters having 10 to 20 metal atoms or fewer.

35. The process of claim 3, further comprising recovering the mobile kerogen-based product using an extraction fluid selected from the group consisting of ethanol, acetonitrile, 2-propanol, dimethyl sulfoxide, methanol, and mixtures thereof.

36. The process of claim 3, further comprising recovering the mobile kerogen based product by pumping.

37. The process of claim 35, further comprising upgrading the mobile kerogen-based product at surface facilities.

38. A process for extracting a kerogen-based produce from a subsurface shale formation comprising kerogen in an inorganic matrix, the process comprising the steps of:

a) extracting extractible organics from the subsurface shale formation comprising kerogen in an inorganic matrix;

b) oxidizing the kerogen in the subsurface shale formation;

c) providing a fluid comprising at least one ionic metal to the subsurface shale formation comprising kerogen in an inorganic matrix;

d) contacting the ionic metal with a reducing agent to form a metal particulate catalyst in situ in the formation; wherein at least 50 wt. % of the metal particulate catalyst is in clusters having fewer than 100 metal atoms;

e) converting the kerogen by contacting the kerogen with the metal particulate catalyst to form a mobile kerogen-based product; and
f) recovering at least a portion of the mobile kerogen-based product;
wherein the contacting of the kerogen with the metal particulate catalyst in step e) is performed without supplying added heat to the formation.

39. The process of claim 38, wherein the extractible organics are extracted from the subsurface shale formation by contacting with a solvent selected from the group consisting of 2-methyl tetrahydrofuran, methanol, ethanol, acetone, cyclopentyl methyl ether (CPME), ethyl lactate, dibasic esters (DBE), propylene carbonate, dimethyl carbonate, $CO_2$, $CO_2$ at supercritical conditions, and mixtures thereof.

40. The process of claim 38, wherein the oxidizing is performed by contacting the kerogen with an oxidizing agent selected from the group consisting of $H_2O_2$, $O_2$, ozone, benzoyl peroxide, permanganates, persulfates, hypochlorite, nitrous oxide, and mixtures thereof.

41. The process of claim 38, wherein the ionic metal is $Ni^{2+}$ and the fluid is ethanol.

42. The process of claim 41, wherein the ionic metal is deposited on the kerogen.

43. The process of claim 38, further comprising recovering the mobile kerogen-based product using an extraction fluid selected from the group consisting of ethanol, acetonitrile, 2-propanol, dimethyl sulfoxide, methanol, and mixtures thereof.

44. The process of claim 38, further comprising recovering the mobile kerogen based product by pumping.

45. The process of claim 43, further comprising upgrading the mobile kerogen-based product at surface facilities.

46. The process of claim 1, wherein the metal is a transition metal.

47. The process of claim 4, wherein the metal is a transition metal.

48. The process of claim 1, wherein the reducing agent is selected from the group consisting of hydrogen, hydrazine, sodium borohydride ($NaBH_4$), a hydrogen donor solvent, and mixtures thereof.

49. The process of claim 36, further comprising upgrading the mobile kerogen-based product at surface facilities.

50. The process of claim 44, further comprising upgrading the mobile kerogen-based product at surface facilities.

* * * * *